United States Patent
Parkin et al.

(10) Patent No.: US 11,065,608 B2
(45) Date of Patent: Jul. 20, 2021

(54) MULTIDENTATE LIGANDS AND USE THEREOF

(71) Applicant: THE TRUSTEES OF COLUMBIA UNIVERSITY IN THE CITY OF NEW YORK, New York, NY (US)

(72) Inventors: Gerard Parkin, New York, NY (US); Michael Rauch, New York, NY (US); Serge Ruccolo, Somerville, MA (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 101 days.

(21) Appl. No.: 16/359,136

(22) Filed: Mar. 20, 2019

(65) Prior Publication Data
US 2019/0291088 A1 Sep. 26, 2019

Related U.S. Application Data

(60) Provisional application No. 62/646,062, filed on Mar. 21, 2018.

(51) Int. Cl.
*B01J 31/18* (2006.01)
*B01J 31/16* (2006.01)

(52) U.S. Cl.
CPC ......... *B01J 31/183* (2013.01); *B01J 31/1633* (2013.01); *B01J 2231/12* (2013.01); *B01J 2231/321* (2013.01); *B01J 2231/323* (2013.01); *B01J 2231/645* (2013.01); *B01J 2231/648* (2013.01); *B01J 2531/0247* (2013.01); *B01J 2531/11* (2013.01); *B01J 2531/22* (2013.01); *B01J 2531/26* (2013.01); *B01J 2531/847* (2013.01)

(58) Field of Classification Search
None
See application file for complete search history.

(56) References Cited

PUBLICATIONS

JACS. 138, 14542 (Year: 2016).*
Harder, "Molecular early main group metal hydrides: synthetic challenge, structures and applications" Chem. Commun. 2012, 48, 11165.
Sarish, et al. "Chemistry of Soluble β-Diketiminatoalkaline-Earth Metal Complexes with M-X Bonds (M=Mg, Ca, Sr; X=OH, Halides, H)," Acc. Chem. Res. 2011, 44, 157.
Rochat, et al "Recent Developments in Homogeneous Organomagnesium Catalysis," ChemCatChem 2016, 8, 10.
Hill, et al. "Alkaline earths as main group reagents in molecular catalysis," Chem. Soc. Rev. 2016, 45, 972.
Arrowsmith, "Magnesium and Calcium Complexes in Homogeneous Catalysis," Enc. Inorg. Bioinorg. Chem. 2015, 1-26.
Crimmin, et al. "Homogeneous Catalysis with Organometallic Complexes of Group 2," Top. Organomet. Chem. 2013, 45, 191.
Revunova, et al. "Main group catalysed reduction of unsaturated bonds," Dalton Trans. 2015, 44, 840.
Dunne, et al. "Tris(oxazolinyl)boratomagnesium-Catalyzed Cross-Dehydrocoupling of Organosilanes with Amines, Hydrazine, and Ammonia," J. Am. Chem. Soc. 2011, 133, 16782.
Schnitzler, et al. "Reactivity of a Molecular Magnesium Hydride Featuring a Terminal Magnesium-Hydrogen Bond," J. Inorg. Chem. 2016, 55, 12997.
Spielmann, et al. "Early Main-Group Metal Catalysts for the Hydrogenation of Alkenes with H2," Angew. Chem., Int. Ed. 2008, 47, 9434.
Buch, et al. "Hydrosilylation of Alkenes with Early Main-Group Metal Catalysts," Angew. Chem., Int. Ed. 2006, 45, 2741.
Meister, et al. "Platinum Catalysis Revisited—Unraveling Principles of Catalytic Olefin Hydrosilylation," ACS Catal. 2016, 6, 1274.
Aresta, M. "The Versatility of Carbon Dioxide," Carbon Dioxide as a Chemical Feedstock; Wiley-VCH: Weinheim, 2010.
Liu, et al. "Using carbon dioxide as a building block in organic synthesis," Nat. Commun. 2015, 6, 5933.
Fraga, et al. "A framework for the analysis of the security of supply of utilising carbon dioxide as a chemical feedstock," Faraday Discuss. 2015, 183, 309.

* cited by examiner

*Primary Examiner* — Yun Qian
(74) *Attorney, Agent, or Firm* — Bryan Cave Leighton Paisner LLP

(57) ABSTRACT

The present invention provides, inter alia, a multidentate ligand having the structure of:

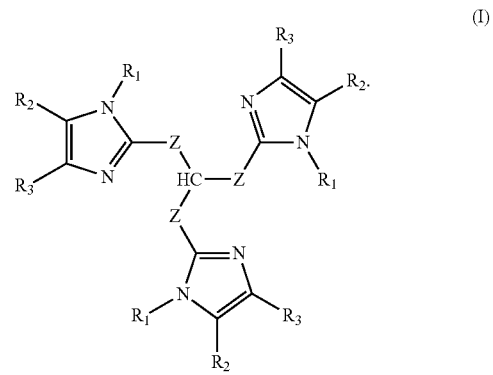

Also provided are methods of preparing metal complexes from the multidentate ligand, and the metal complexes prepared by such methods. Further provided are catalysts comprising such metal complexes, and various uses of such catalysts.

3 Claims, No Drawings

MULTIDENTATE LIGANDS AND USE THEREOF

CROSS REFERENCE TO RELATED APPLICATIONS

The present application claims benefit of U.S. Provisional patent Application Ser. No. 62/646,062, filed on Mar. 21, 2018 which application is incorporated by reference herein in its entirety.

GOVERNMENT FUNDING

This invention was made with government support under grant nos. CHE-1058987 and CHE-1465095, awarded by NSF, and grant no. DE-FG02-93ER14339, awarded by Department of Energy (DOE). The government has certain rights in the invention.

FIELD OF INVENTION

The present invention provides, inter alia, multidentate ligand having the structure:

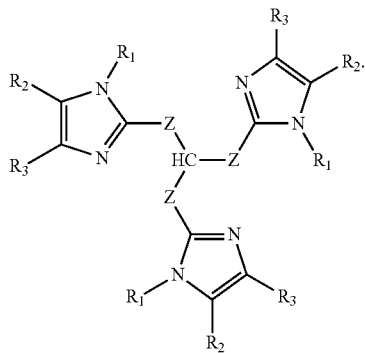

(I)

Also provided are metal complexes generated by the ligands of the present invention, as well as methods of using such ligands and complexes.

BACKGROUND OF THE INVENTION

Despite their paucity, terminal metal hydride compounds offer much potential, and are often invoked as intermediates in a variety of catalytic cycles, including hydrosilylation, hydroboration, hydroamination, and hydrogenation (Harder 2012; Sarish et al 2011; Rochat et al 2016; Hill et al 2016; Arrowsmith 2015; Crimmin et al 2013; Revunova et al 2015; Dunne et al 2011; Schnitzler et al 2016; Spielmann et al 2008; Buch et al 2006). Such transformations offer potential societal benefits, especially considering that, for example, industrial hydrosilylation reactions typically employ precious metal catalysts (Meister et al 2016).

Also, the efficient utilization of carbon dioxide as a renewable $C_1$ source for the synthesis of value-added organic chemicals and fuels is not only of intrinsic value, but also offers potential for abating the increasing levels of carbon dioxide in the atmosphere (Aresta 2010; Liu et al 2015; Fraga et al 2015). However, $CO_2$ is thermodynamically very stable and kinetically resistant to many transformations, which presents a major impediment to achieving this objective.

Accordingly, there is a need for the exploration of various terminal metal hydride compounds that can be used in catalytic systems for hydrosilylation, hydroboration, hydroamination and hydrogenation that employ non-precious metals, occur at room temperature, and may be modified to control the level of reduction. This invention is directed to meet these and other needs.

SUMMARY OF THE INVENTION

One embodiment of the present invention is a compound multidentate ligand having the structure of formula (I):

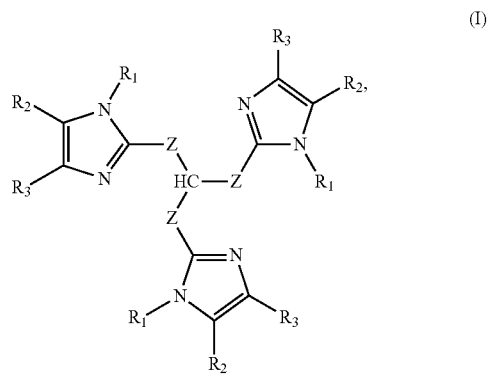

(I)

wherein:
Z is a linker group;
$R_1$ is selected from the group consisting of H, halide, alkyl, aryl, aralkyl, heteroalkyl, heteroaryl, alkoxy, hydroxy, heteroalkoxy, amino, alkylamino, arylamino, cyano, nitro, sulfonyl, or a heterocyclic group;
$R_2$ and $R_3$ are independently selected from the group consisting of H, halide, alkyl, aryl, aralkyl, heteroalkyl, heteroaryl, alkoxy, hydroxy, heteroalkoxy, amino, alkylamino, arylamino, cyano, nitro, sulfonyl, or a heterocyclic group; or together form a saturated or unsaturated $C_{5-7}$ homocyclic or heterocyclic ring, wherein the ring is optionally substituted with groups selected from H, halide, alkyl, aryl, aralkyl, heteroalkyl, heteroaryl, alkoxy, hydroxy, heteroalkoxy, amino, alkylamino, arylamino, cyano, nitro, sulfonyl, or a heterocyclic group.

Another embodiment of the present invention is a multidentate ligand having the following structure:

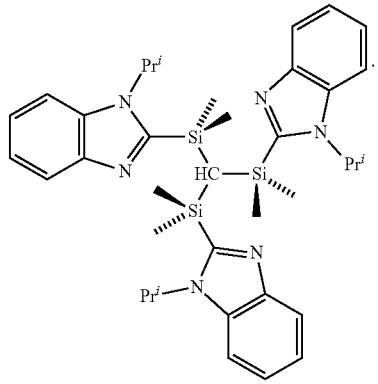

Another embodiment of the present invention is a method of preparing a metal complex. This method comprises coordinating a ligand disclosed herein to a metal center via a combination of up to three nitrogen donors and a carbon atom.

Another embodiment of the present invention is a metal complex prepared by a method disclosed herein. The metal complex has the structure of formula (II):

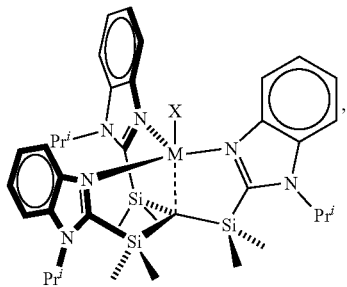

(II)

wherein:

M is an atom selected from Li, Mg, Ca, Fe, Ni, Cu, Zn, Zr and Cd; and

X is selected from no atom, H, Me, halogen, $O_2CH$, $S_2CH$, SH, N(H)Ph, CH(Me)Ph, $O_2CMe$ and $S_2CMe$.

Another embodiment of the present invention is a metal complex prepared by a method disclosed herein. The metal complex has the following structure:

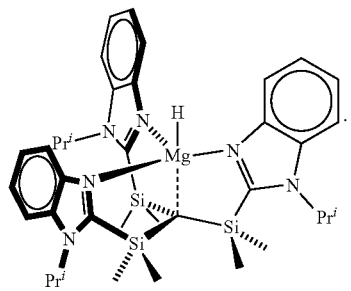

Another embodiment of the present invention is a metal complex prepared by a method disclosed herein. The metal complex has the following structure:

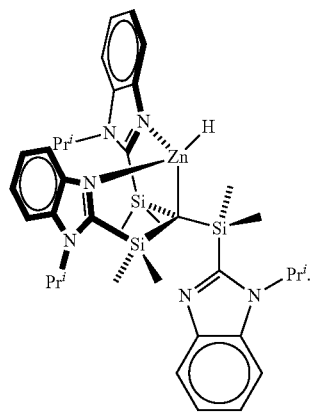

Another embodiment of the present invention is a catalyst. The catalyst comprises at least one metal complex disclosed herein.

Another embodiment of the present invention is a method of catalyzing hydrosilylation of styrenes. This method comprises providing a catalyst disclosed herein to a hydrosilylation reaction of a styrene.

Another embodiment of the present invention is a method of catalyzing hydroboration of styrenes. This method comprises providing a catalyst disclosed herein to a hydroboration reaction of a styrene.

Another embodiment of the present invention is a method of catalyzing hydrosilylation of carbon dioxide. This method comprises providing a catalyst disclosed herein to a hydrosilylation reaction of carbon dioxide.

Another embodiment of the present invention is a method of preparing a formaldehyde equivalent from carbon dioxide. This method comprises contacting a reaction mixture comprising carbon dioxide and a silane with a compound prepared from a multidentate ligand disclosed herein, wherein the silane is $R_3SiH$ and R is selected from H, alkyl and aryl.

A further embodiment of the present invention is a method of reducing carbon monoxide. This method comprises contacting a reaction mixture comprising carbon monoxide with a compound prepared from a multidentate ligand disclosed herein.

Another embodiment of the present invention is a method of catalyzing hydrogenation of alkenes or alkynes. This method comprises providing a catalyst disclosed herein to a hydrogenation reaction of an alkene or an alkyne.

Another embodiment of the present invention is a method of catalyzing polymerization of alkenes. This method comprises providing a catalyst disclosed herein to a polymerization reaction of alkenes.

Another embodiment of the present invention is a method of catalyzing production of hydrogen-on-demand from alcohols or amines. This method comprises providing a catalyst disclosed herein to the reaction.

Another embodiment of the present invention is a method of catalyzing hydrosilylation of ketones or aldehydes. This method comprises providing a catalyst disclosed herein to a hydrosilylation reaction of a ketone or an aldehyde.

Another embodiment of the present invention is a method of catalyzing Tishchenko reaction. This method comprises providing a catalyst disclosed herein to the reaction.

Another embodiment of the present invention is a method of catalyzing hydrogenation of carbon dioxide. This method comprises providing a catalyst disclosed herein to a hydrogenation reaction of carbon dioxide.

Another embodiment of the present invention is a method of catalyzing hydrogenation of carbon monoxide. This method comprises providing a catalyst disclosed herein to a hydrogenation reaction of carbon monoxide.

BRIEF DESCRIPTION OF THE DRAWINGS

The application file contains at least one photograph executed in color. Copies of this patent application with color photographs will be provided by the Office upon request and payment of the necessary fee.

DETAILED DESCRIPTION OF THE INVENTION

In the present invention, multidentate ligands and metal complexes prepared from the same are provided. Certain of the metal complexes can be used in catalytic systems for hydrosilylation, hydroboration, hydroamination and hydrogenation. Accordingly, one aspect of the present invention is a multidentate ligand having the structure of formula (I):

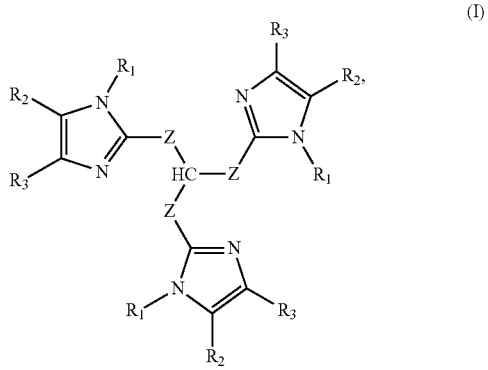

wherein:
Z is a linker group;
R$_1$ is selected from the group consisting of H, halide, alkyl, aryl, aralkyl, heteroalkyl, heteroaryl, alkoxy, hydroxy, heteroalkoxy, amino, alkylamino, arylamino, cyano, nitro, sulfonyl, or a heterocyclic group;
R$_2$ and R$_3$ are independently selected from the group consisting of H, halide, alkyl, aryl, aralkyl, heteroalkyl, heteroaryl, alkoxy, hydroxy, heteroalkoxy, amino, alkylamino, arylamino, cyano, nitro, sulfonyl, or a heterocyclic group; or together form a saturated or unsaturated C$_{5-7}$ homocyclic or heterocyclic ring, wherein the ring is optionally substituted with groups selected from H, halide, alkyl, aryl, aralkyl, heteroalkyl, heteroaryl, alkoxy, hydroxy, heteroalkoxy, amino, alkylamino, arylamino, cyano, nitro, sulfonyl, or a heterocyclic group.

In some embodiments, the linker group Z comprises a silicon-containing group.

In some embodiments, the linker group Z is Si(R$_4$)$_2$; and wherein R$_4$ is selected from the group consisting of H, halide, alkyl, aryl, aralkyl, heteroalkyl, heteroaryl, alkoxy, hydroxy, heteroalkoxy, amino, alkylamino, arylamino, cyano or a heterocyclic group.

Preferably, the multidentate ligand of this embodiment has the following structure:

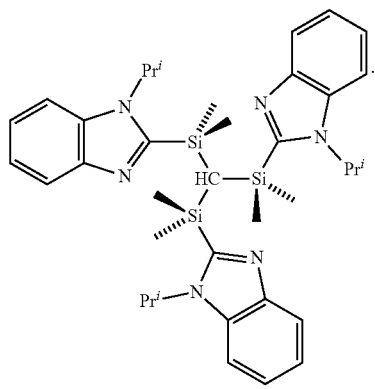

Another embodiment of the present invention is method of preparing a metal complex. This method comprises coordinating a ligand disclosed herein to a metal center via a combination of up to three nitrogen donors and a carbon atom.

Preferably, the metal center comprises an atom selected from the main group metals, transition metals, or lanthanoids.

More preferably, the metal center comprises an atom selected from Li, Mg, Ca, Fe, Ni, Cu, Zn, Zr and Cd.

Another aspect of the present invention is a metal complex prepared by a method disclosed herein. The metal complex has the structure of formula (II):

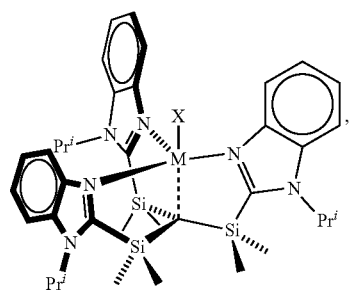

wherein:
M is an atom selected from Li, Mg, Ca, Fe, Ni, Cu, Zn, Zr and Cd; and X is selected from no atom, H, Me, halogen, O$_2$CH, S$_2$CH, SH, N(H)Ph, CH(Me)Ph, O$_2$CMe and S$_2$CMe.

Preferably, the metal complex has a structure selected from the group consisting of:

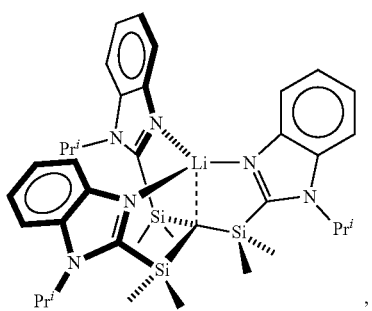

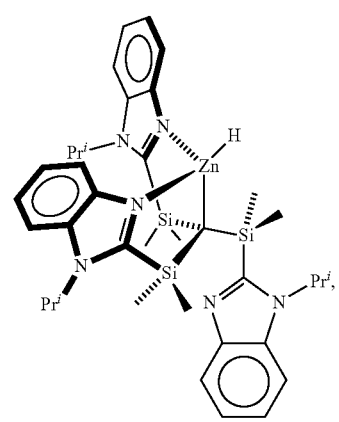

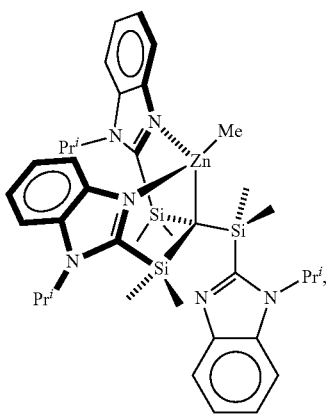
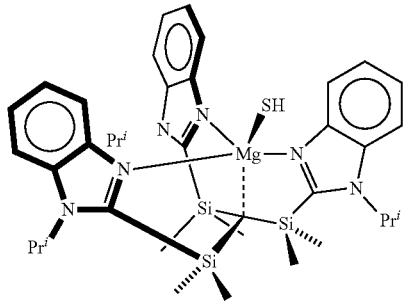
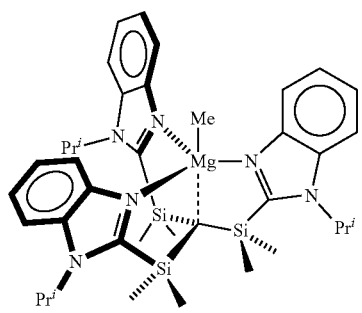
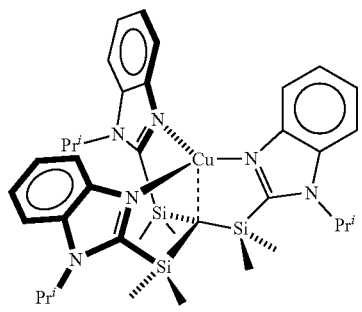
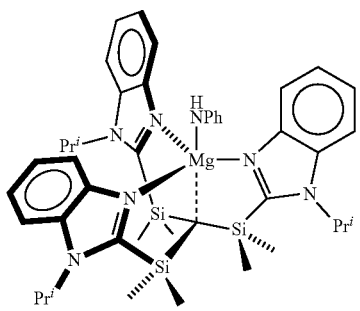
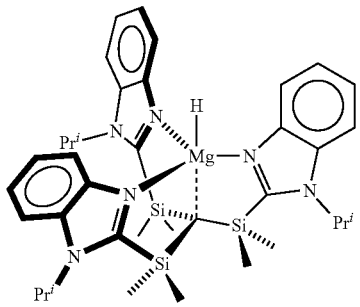
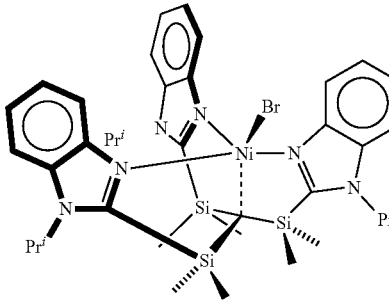
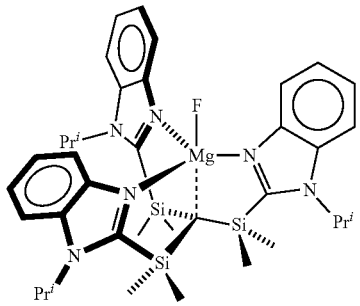
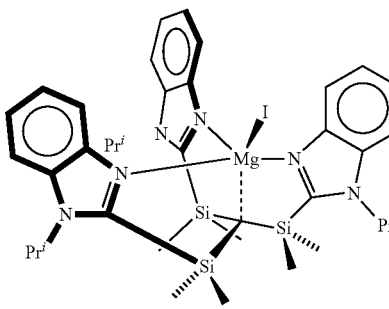
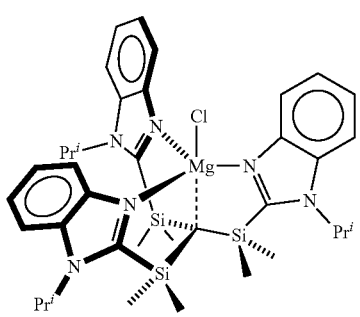

-continued

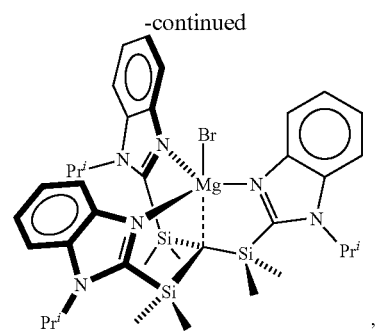

,

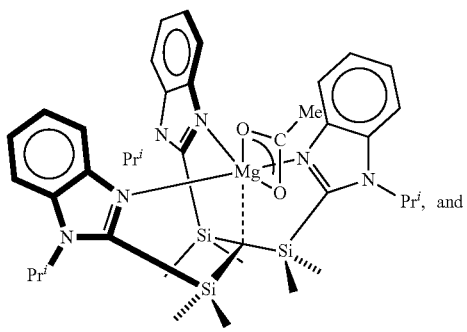

Pr^i, and

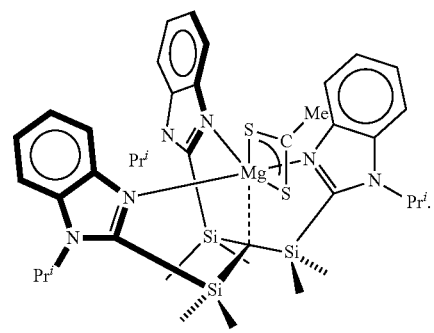

.

More preferably, the metal complex has the following structure:

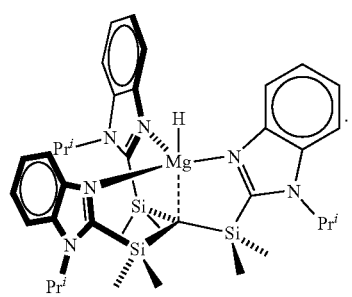

More preferably, the metal complex has the following structure:

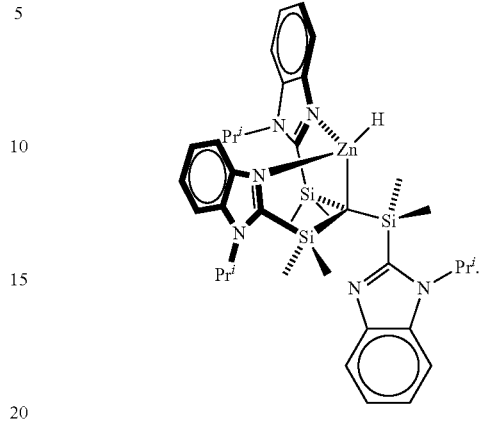

Another aspect of the present invention is a catalyst. The catalyst comprises at least one metal complex disclosed herein.

Another aspect of the present invention is a method of catalyzing hydrosilylation of styrenes. This method comprises providing a catalyst disclosed herein to a hydrosilylation reaction of a styrene.

Another aspect of the present invention is a method of catalyzing hydroboration of styrenes. This method comprises providing a catalyst disclosed herein to a hydroboration reaction of a styrene.

Another aspect of the present invention is a method of catalyzing hydrosilylation of carbon dioxide. This method comprises providing a catalyst disclosed herein to a hydrosilylation reaction of carbon dioxide.

Still another aspect of the present invention is a method of preparing a formaldehyde equivalent from carbon dioxide. This method comprises contacting a reaction mixture comprising carbon dioxide and a silane with a compound prepared from a multidentate ligand disclosed herein, wherein the silane is $R_3SiH$ and R is selected from H, alkyl and aryl.

In some embodiments, the multidentate ligand has the structure:

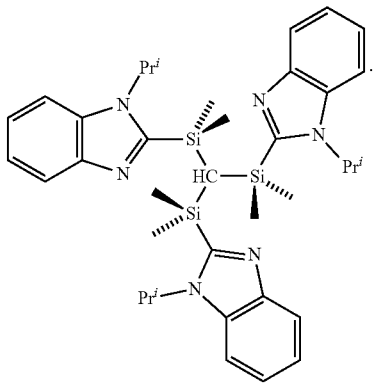

In some embodiments, the compound comprises at least one metal complex disclosed herein.

A further aspect of the present invention is a method of reducing carbon monoxide. This method comprises contacting a reaction mixture comprising carbon monoxide with a compound prepared from a multidentate ligand disclosed herein.

In some embodiments, the multidentate ligand has the structure:

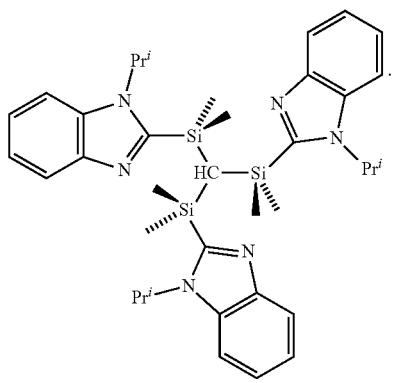

In some embodiments, the compound comprises at least one metal complex disclosed herein.

Another aspect of the present invention is a method of catalyzing hydrogenation of alkenes or alkynes. This method comprises providing a catalyst disclosed herein to a hydrogenation reaction of an alkene or an alkyne.

Another aspect of the present invention is a method of catalyzing polymerization of alkenes. This method comprises providing a catalyst disclosed herein to a polymerization reaction of alkenes.

Another aspect of the present invention is a method of catalyzing production of hydrogen-on-demand from alcohols or amines. This method comprises providing a catalyst disclosed herein to the reaction.

Another aspect of the present invention is a method of catalyzing hydrosilylation of ketones or aldehydes. This method comprises providing a catalyst disclosed herein to a hydrosilylation reaction of a ketone or an aldehyde.

Another aspect of the present invention is a method of catalyzing Tishchenko reaction. This method comprises providing a catalyst disclosed herein to the reaction.

Another aspect of the present invention is a method of catalyzing hydrogenation of carbon dioxide. This method comprises providing a catalyst disclosed herein to a hydrogenation reaction of carbon dioxide.

Another aspect of the present invention is a method of catalyzing hydrogenation of carbon monoxide. This method comprises providing a catalyst disclosed herein to a hydrogenation reaction of carbon monoxide.

In the foregoing embodiments, the following definitions apply.

The term "alkyl" refers to the radical of saturated aliphatic groups that does not have a ring structure, including straight-chain alkyl groups, and branched-chain alkyl groups. In certain embodiments, a straight chain or branched chain alkyl has 6 or fewer carbon atoms in its backbone (e.g., $C_1$-$C_6$ for straight chains, $C_3$-$C_6$ for branched chains). Such substituents include all those contemplated for aliphatic groups, as discussed below, except where stability is prohibitive.

The term "alkoxy", as used herein, refers to an alkyl (carbon and hydrogen chain) group singularly bonded to oxygen; thus R—O. Related to alkoxy groups are aryloxy groups, which have an aryl group singular bonded to oxygen such as the phenoxy group ($C_6H_5O$—).

The term "alkene" or "olefin", as used herein, refers to an unsaturated hydrocarbon that contains at least one carbon-carbon double bond.

The term "alkyne", as used herein, refers to an unsaturated hydrocarbon containing at least one carbon-carbon triple bond.

The term "alkenyl", as used herein, refers to an aliphatic group containing at least one double bond and unless otherwise indicated, is intended to include both "unsubstituted alkenyls" and "substituted alkenyls", the latter of which refers to alkenyl moieties having substituents replacing a hydrogen on one or more carbons of the alkenyl group. Such substituents include all those contemplated for aliphatic groups, as discussed below, except where stability is prohibitive. For example, substitution of alkenyl groups by one or more alkyl, carbocyclyl, aryl, heterocyclyl, or heteroaryl groups is contemplated.

Moreover, unless otherwise indicated, the term "alkyl" as used throughout the specification, examples, and claims is intended to include both "unsubstituted alkyls" and "substituted alkyls", the latter of which refers to alkyl moieties having substituents replacing a hydrogen on one or more carbons of the hydrocarbon backbone. Indeed, unless otherwise indicated, all groups recited herein are intended to include both substituted and unsubstituted options.

The term "$C_{x-y}$" when used in conjunction with a chemical moiety, such as, alkyl and cycloalkyl, is meant to include groups that contain from x to y carbons in the chain. For example, the term "$C_{x-y}$alkyl" refers to substituted or unsubstituted saturated hydrocarbon groups, including straight-chain alkyl and branched-chain alkyl groups that contain from x to y carbons in the chain, including haloalkyl groups such as trifluoromethyl and 2,2,2-trifluoroethyl, etc.

The term "aryl" as used herein includes substituted or unsubstituted single-ring aromatic groups in which each atom of the ring is carbon. Preferably the ring is a 3 to 8-membered ring, more preferably a 6-membered ring. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Aryl groups include benzene, naphthalene, phenanthrene, phenol, aniline, and the like.

The term "alkyl-aryl" or "aralkyl" refers to an alkyl group substituted with at least one aryl group.

The term "alkyl-heteroaryl" refers to an alkyl group substituted with at least one heteroaryl group.

The term "alkenyl-aryl" refers to an alkenyl group substituted with at least one aryl group.

The term "alkenyl-heteroaryl" refers to an alkenyl group substituted with at least one heteroaryl group.

The term "amino," as used herein, alone or in combination, refers to —NRR', wherein R and R' are independently chosen from hydrogen, alkyl (i.e., alkylamino), acyl, heteroalkyl, aryl (i.e., arylamino), cycloalkyl, heteroaryl, and heterocycloalkyl, any of which may themselves be optionally substituted. Additionally, R and R' may combine to form heterocycloalkyl, either of which may be optionally substituted.

The term "amine", as used herein, refers to a compound or a functional group that contains a basic nitrogen atom with a lone pair. Amines are formally derivatives of ammonia, where in one or more hydrogen atoms have been replaced by a substituent such as an alkyl or aryl group (these may respectively be called alkylamines and arylamines; amines in which both types of substituent are attached to one nitrogen atom may be called alkylarylamines).

The term "cyano," as used herein, alone or in combination, refers to —CN.

The term "sulfonyl", as used herein, alone or in combination, refers either to a functional group found primarily in sulfones or to a substituent obtained from a sulfonic acid by the removal of the hydroxyl group similarly to acyl groups. Sulfonyl groups can be written as having the general formula R—S($=$O)$_2$—R', where there are two double bonds between the sulfur and oxygen.

The term "alcohol" means an organic compound in which the hydroxyl functional group (—OH) is bound to a saturated carbon atom.

The term "ketone" means an organic compound with the structure RC($=$O)R', wherein neither R and R' can be hydrogen atoms.

The term "aldehyde" or "alkanal" means an organic compound containing a functional group with the structure —CHO, consisting of a carbonyl center (a carbon double-bonded to oxygen) with the carbon atom also bonded to hydrogen and to an R group, which is any generic alkyl or side chain. The group (without R) is the aldehyde group, also known as the formyl group.

The term "cycloalkyl," or, alternatively, "carbocycle," as used herein, alone or in combination, refers to a saturated or partially saturated monocyclic, bicyclic or tricyclic alkyl group wherein each cyclic moiety contains from 3 to 12 carbon atom ring members and which may optionally be a benzo fused ring system which is optionally substituted as defined herein. In certain embodiments, said cycloalkyl will comprise from 5 to 7 carbon atoms. Examples of such cycloalkyl groups include cyclopropyl, cyclobutyl, cyclopentyl, cyclohexyl, cycloheptyl, tetrahydronaphthyl, indanyl, octahydronaphthyl, 2,3-dihydro-1H-indenyl, adamantyl and the like. "Bicyclic" and "tricyclic" as used herein are intended to include both fused ring systems, such as decahydronaphthalene, octahydronaphthalene as well as the multicyclic (multicentered) saturated or partially unsaturated type. The latter type of isomer is exemplified in general by, bicyclo[1,1,1]pentane, camphor, adamantane, and bicyclo[3,2,1]octane.

The term "heteroatom" as used herein means an atom of any element other than carbon or hydrogen. Preferred heteroatoms are nitrogen, oxygen, and sulfur; more preferably, nitrogen and oxygen.

The term "heteroalkyl," as used herein, alone or in combination, refers to a stable straight or branched chain, or cyclic hydrocarbon radical, or combinations thereof, fully saturated or containing from 1 to 3 degrees of unsaturation, consisting of the stated number of carbon atoms and from one to three heteroatoms chosen from 0, N, and S, and wherein the nitrogen and sulfur atoms may optionally be oxidized and the nitrogen heteroatom may optionally be quaternized. The heteroatom(s) O, N and S may be placed at any interior position of the heteroalkyl group.

The term "heteroaryl" includes substituted or unsubstituted aromatic single ring structures, preferably 3- to 8-membered rings, more preferably 5- to 7-membered rings, even more preferably 5- to 6-membered rings, whose ring structures include at least one heteroatom, preferably one to four heteroatoms, more preferably one or two heteroatoms. The term "heteroaryl" also includes polycyclic ring systems having two or more cyclic rings in which two or more carbons are common to two adjoining rings wherein at least one of the rings is heteroaromatic, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, and pyrimidine, and the like.

The terms "heterocycloalkyl" and, interchangeably, "heterocycle," as used herein, alone or in combination, each refer to a saturated, partially unsaturated, or fully unsaturated monocyclic, bicyclic, or tricyclic heterocyclic group containing at least one heteroatom as a ring member, wherein each said heteroatom may be independently chosen from N, O, and S. Additionally, a heterocycloalkyl may contain one or two C(O), S(O), or S(O)$_2$ groups as ring members. In certain embodiments, said heterocycloalkyl will comprise from 1 to 4 heteroatoms as ring members. In further embodiments, said heterocycloalkyl will comprise from 1 to 2 heteroatoms as ring members. In certain embodiments, said heterocycloalkyl will comprise from 3 to 8 ring members in each ring. In further embodiments, said heterocycloalkyl will comprise from 3 to 7 ring members in each ring. In yet further embodiments, said heterocycloalkyl will comprise from 5 to 6 ring members in each ring. "Heterocycloalkyl" and "heterocycle" are intended to include sulfones, sulfoxides, N-oxides of tertiary nitrogen ring members, and carbocyclic fused and benzo fused ring systems; additionally, both terms also include systems where a heterocycle ring is fused to an aryl group, as defined herein, or an additional heterocycle group. Examples of heterocycle groups include aziridinyl, azetidinyl, 1,3-benzodioxolyl, dihydroisoindolyl, dihydroisoquinolinyl, dihydrocinnolinyl, dihydrobenzodioxinyl, dihydro[1,3]oxazolo[4,5-b]pyridinyl, benzothiazolyl, dihydroindolyl, dihy-dropyridinyl, 1,3-dioxanyl, 1,4-dioxanyl, 1,3-dioxolanyl, isoindolinyl, morpholinyl, piperazinyl, pyrrolidinyl, tetrahydropyridinyl, piperidinyl, thiomorpholinyl, and the like. The heterocycle groups may be optionally substituted unless specifically prohibited.

The term "hydroxy," as used herein, alone or in combination, refers to —OH.

The terms "halo" and "halogen" are used interchangeably herein and mean halogen and include chloro, fluoro, bromo, and iodo.

The term "halide", as used herein, refers to a binary phase, of which one part is a halogen atom and the other part is an element or radical that is less electronegative (or more electropositive) than the halogen, to make a fluoride, chloride, bromide, or iodide compound. The alkali metals combine directly with halogens under appropriate conditions forming halides of the general formula, MX (X$=$F, Cl, Br or I).

The term "haloalkoxy," as used herein, alone or in combination, refers to a haloalkyl group attached to the parent molecular moiety through an oxygen atom. Haloalkoxy includes perhaloalkoxy. The term "perhaloalkoxy" refers to an alkoxy group where all of the hydrogen atoms are replaced by halogen atoms. An example of perhaloalkoxy is perfluoromethoxy.

The term "haloalkyl," as used herein, alone or in combination, refers to an alkyl radical having the meaning as defined above wherein one or more hydrogens are replaced with a halogen. Specifically embraced are monohaloalkyl, dihaloalkyl, polyhaloalkyl, and perhaloalkyl radicals. A monohaloalkyl radical, for one example, may have an iodo, bromo, chloro or fluoro atom within the radical. Dihalo and polyhaloalkyl radicals may have two or more of the same halo atoms or a combination of different halo radicals. Examples of haloalkyl radicals include fluoromethyl, difluoromethyl, trifluoromethyl, chloromethyl, dichloromethyl, trichloromethyl, pentafluoroethyl, heptafluoropropyl, difluorochloromethyl, dichlorofluoromethyl, difluoroethyl, difluoropropyl, dichloroethyl and dichloropropyl. "Haloalkylene" refers to a haloalkyl group attached at two or more positions. Examples of haloalkyl radicals include fluoromethyl, difluoromethyl, trifluoromethyl, chloromethyl, dichloromethyl, trichloromethyl, pentafluoroethyl, heptafluoropropyl, difluorochloromethyl, dichlorofluoromethyl, difluoroethyl, difluoropropyl, dichloroethyl and dichloropropyl. "Haloalkylene" refers to a haloalkyl group attached at two or more positions. Examples include fluoromethylene (—CFH—), difluoromethylene (—CF$_2$—), chloromethylene (—CHCl—) and the like. The term "perhaloalkyl" as used herein, alone or in combination, refers to an alkyl group where all of the hydrogen atoms are replaced by halogen atoms. Examples include perfluoromethyl.

The term "nitro," as used herein, alone or in combination, refers to —NO$_2$.

The term "substituted" refers to moieties having substituents replacing a hydrogen on one or more carbons of the backbone. It will be understood that "substitution" or "substituted with" includes the implicit proviso that such substitution is in accordance with the permitted valence of the substituted atom and the substituent, and that the substitution results in a stable compound, e.g., which does not spontaneously undergo transformation such as by rearrangement, cyclization, elimination, etc. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that the moieties substituted on the hydrocarbon chain can themselves be substituted, if appropriate.

As set forth previously, unless specifically stated as "unsubstituted," references to chemical moieties herein are understood to include substituted variants. For example, reference to an "aryl" group or moiety implicitly includes both substituted and unsubstituted variants.

It is understood that the disclosure of a compound herein encompasses all stereoisomers of that compound. As used herein, the term "stereoisomer" refers to a compound made up of the same atoms bonded by the same bonds but having different three-dimensional structures which are not interchangeable. The three-dimensional structures are called configurations. Stereoisomers include enantiomers and diastereomers.

The following examples are provided to further illustrate the methods of the present invention. These examples are illustrative only and are not intended to limit the scope of the invention in any way.

EXAMPLES

The invention is further illustrated by the following examples, which are offered for illustrative purposes, and are not intended to limit the invention in any manner. Those of skill in the art will readily recognize a variety of non-critical parameters, which can be changed or modified to yield essentially the same results.

Example 1

Methods and Materials

General Considerations

All manipulations were performed using a combination of glovebox, high vacuum, and Schlenk techniques under an argon atmosphere. Solvents were purified and degassed by standard procedures.

$^1$H NMR chemical shifts are reported in ppm relative to SiMe$_4$ ($\delta$=0) and were either referenced directly (for C$_6$D$_5$Br) or with respect to the protio solvent impurity ($\delta$=7.16 for C$_6$D$_5$H, $\delta$=2.08 for toluene-d$_8$). $^{13}$C NMR spectra are reported in ppm relative to SiMe$_4$ ($\delta$=0) and were referenced internally with respect to the solvent ($\delta$=128.06 for C$_6$D$_6$, $\delta$=128.06 for C$_6$D$_5$H, $\delta$=20.43 for toluene-d$_8$). $^7$Li NMR are reported in ppm relative to LiCl ($\delta$=0) and were obtained by using the $\Xi$/100% value of 38.863797. $^{19}$F NMR chemical shifts are reported in ppm relative to CFCl$_3$ ($\delta$=0.0) and were obtained by using the $\Xi$/100% value of 94.09-4011. $^{29}$Si NMR chemical shifts are reported in ppm relative to SiMe$_4$ ($\delta$=0.0) and were obtained by using the $\Xi$/100% value of 19.867187. $^{11}$B NMR chemical shifts are reported in ppm relative to BF$_3$.OEt$_2$ and were obtained by using the $\Xi$/100% value of 32.083974. Coupling constants are given in hertz. Infrared spectra were recorded on a Perkin Elmer Spectrum Two spectrometer in attenuated total reflectance (ATR) mode, or a Thermo Scientifc Nicolet FT-IR 6700 spectrometer with a liquid N2 cooled MCT-A detector, and are reported in reciprocal centimeters.

1-isopropylbenzimidazole, HC(SiMe$_2$Cl)$_3$, Me$_2$Mg, [Me$_3$PCuCl]4, [Tism$^{Pr^iBenz}$]MgMe, [Tism$^{Pr^iBenz}$]Li, [Tism$^{Pr^iBenz}$]MgH, Me$_3$SnF and Me$_3$SnI were obtained by literature methods and Bu$^n$Li (Aldrich), MeLi (Aldrich), Me$_2$Zn (Aldrich), (Ph$_3$P)$_2$NiBr$_2$ (Strem), PhSiH$_3$, pinacolborane, CO$_2$, CS$_2$, PhNH$_2$, H$_2$S, styrene, N,N'-dicyclohexylcarbodiimide, N,N'-diisopropylcarbodiimide, pyridine, TEMPO (Sigma Aldrich), Me$_3$SnCl (Strem Chemicals), Me$_3$SnBr (Alfa Aesar), KOSiMe$_3$ (90%), ZnBr$_2$, Et$_3$SiH, $^{13}$CO$_2$ (Cambridge Isotopes Laboratories) and Ph$_3$SiH (Alfa Aesar) were obtained commercially and used as received.

X-Ray Structure Determinations

X-ray diffraction data were collected on a Bruker Apex II diffractometer. The structures were solved by using direct methods and standard difference map techniques, and were refined by full-matrix least-squares procedures on F2 with SHELXTL (Version 2014/7).

Example 2

Synthesis of Multidentate Ligands and Metal Complexes

The synthesis of multidentate ligands and various metal complexes and their derivatives are described below in detail.

Preparation of [Tism$^{Pr^jBenz}$]Li

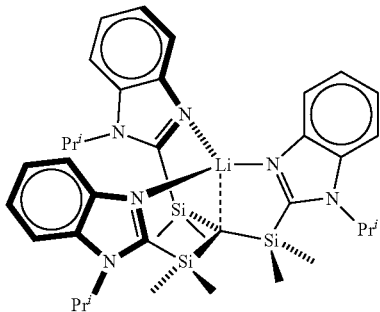

The volatile components of a solution of MeLi in Et$_2$O (56.8 mmol, 35.5 mL of 1.6 M) were removed in vacuo and the solid obtained was dissolved in THF (ca 50 mL). The solution was treated slowly with distilled 1-isopropylbenzimidazole (8.81 g, 55 mmol) over a period of 10 minutes, and stirred for an additional 20 minutes. After this period, the volatile components were removed in vacuo to give an orange oil. Pentane (ca 30 mL) was added and the mixture was stirred for 10 minutes, after which period the volatile components were removed in vacuo to afford a light orange foam-like solid. The solid was dissolved in benzene (ca 30 mL) and the solution was added to a glass pressure vessel containing solid MeLi as obtained by the removal of volatile components in vacuo from a solution of MeLi in Et$_2$O (18.9 mmol, 11.8 mL of 1.6 M). The resulting orange suspension was placed in an ice bath and was treated slowly with a solution of freshly distilled HC(SiMe$_2$Cl)$_3$ (5.4 g, 18.4 mmol) in benzene (ca 20 mL) over a period of ca. 15 minutes. The mixture was allowed to warm to room temperature and stirred until gas evolution ceased (ca 1 hour), after which period the vessel was sealed and stirred at 100° C. for 15 hours. Benzene (ca 40 mL) was added to the resulting red mixture, and the fine precipitate was allowed to settle and the solution was decanted. This process was repeated with two portions of benzene (ca 40 mL) and the combined extracts were concentrated in vacuo to a volume of ca 20 mL, thereby resulting in the deposition of a solid over a period of two days. The solid was isolated by filtration, washed with Et$_2$O (2×ca 20 mL), and dried in vacuo to afford [Tism$^{Pr^jBenz}$]Li as an off-white powder, (5.1 g, 41% yield). Colorless crystals of [Tism$^{Pr^jBenz}$]Li suitable for X-ray diffraction were obtained by slow evaporation of a solution in benzene.

$^1$H NMR (C$_6$D$_6$):
0.63 [s, 18H, (C$_6$H$_4$N$_2$CH(C$\underline{H}_3$)$_2$CSi(CH$_3$)$_2$)$_3$CLi],
1.23 [d, J=7 Hz, 18H, (C$_6$H$_4$N$_2$CH(C$\underline{H}_3$)$_2$CSi(CH$_3$)$_2$)$_3$CLi],
4.84 [sept, J=7 Hz, 3H, (C$_6$H$_4$N$_2$C$\underline{H}$(CH$_3$)$_2$CSi(CH$_3$)$_2$)$_3$CLi],
7.06 [m, 6H, (C$_6$$\underline{H}_4$N$_2$CH(CH$_3$)$_2$CSi(CH$_3$)$_2$)$_3$CLi],
7.28 [m, 3H, (C$_6$$\underline{H}_4$N$_2$CH(CH$_3$)$_2$CSi(CH$_3$)$_2$)$_3$CLi],
8.00 [m, 3H, (C$_6$$\underline{H}_4$N$_2$CH(CH$_3$)$_2$CSi(CH$_3$)$_2$)$_3$CLi].
$^{13}$C NMR (C$_6$D$_6$):
6.23 [s, 6C, (C$_6$H$_4$N$_2$CH(CH$_3$)$_2$CSi(CH$_3$)$_2$)$_3$CLi],
21.18 [s, 6C, (C$_6$H$_4$N$_2$CH(CH$_3$)$_2$CSi(CH$_3$)$_2$)$_3$CLi],
49.40 [s, 3C, (C$_6$H$_4$N$_2$CH(CH$_3$)$_2$CSi(CH$_3$)$_2$)$_3$CLi],
112.73 [s, 3C, (C$_6$H$_4$N$_2$CH(CH$_3$)$_2$CSi(CH$_3$)$_2$)$_3$CLi],
119.78 [s, 3C, (C$_6$H$_4$N$_2$CH(CH$_3$)$_2$CSi(CH$_3$)$_2$)$_3$CLi],
121.91 [s, 3C, (C$_6$H$_4$N$_2$CH(CH$_3$)$_2$CSi(CH$_3$)$_2$)$_3$CLi],
121.96 [s, 3C, (C$_6$H$_4$N$_2$CH(CH$_3$)$_2$CSi(CH$_3$)$_2$)$_3$CLi],
134.21 [s, 30, (C$_6$H$_4$N$_2$CH(CH$_3$)$_2$CSi(CH$_3$)$_2$)$_3$CLi],
145.52 [s, 3C, (C$_6$H$_4$N$_2$CH(CH$_3$)$_2$CSi(CH$_3$)$_2$)$_3$CLi],
169.31 [s, 3C, (C$_6$H$_4$N$_2$CH(CH$_3$)$_2$CSi(CH$_3$)$_2$)$_3$CLi],
not observed [(C$_6$H$_4$N$_2$CH(CH$_3$)$_2$CSi(CH$_3$)$_2$)$_3$CLi].
$^{29}$Si NMR (C$_6$D$_6$): −14.48 [s, (C$_6$H$_4$N$_2$CSi(CH$_3$)$_2$)$_3$CLi].
$^7$Li NMR (C$_6$D$_6$): 5.32.
Anal. calc. for [Tism$^{Pr^jBenz}$]Li: C, 66.2%; H, 7.7%; N, 12.5%. Found: C, 66.5%; H, 7.4%; N, 12.3%.
IR Data (cm$^{-1}$): 3053 (w), 2964 (w), 2949 (w), 1463 (m), 1389 (w), 1371 (w), 1341 (m), 1320 (w), 1282 (m), 1159 (w), 1106 (w), 1061 (m), 964 (vs), 821 (s), 791 (s), 737 (vs), 672 (s).

Preparation of [Tism$^{Pr^jBenz}$]H

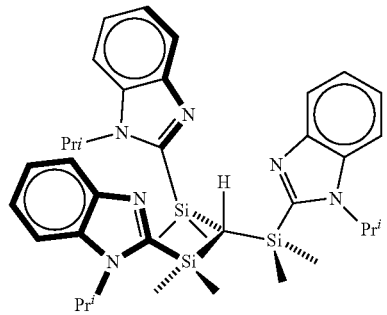

H$_2$O (40 µL, 2.22 mmol) was added to a solution of [Tism$^{Pr^jBenz}$]Li (640 mg, 0.954 mmol) in benzene (ca 25 mL). The mixture was stirred for 1 hour at room temperature, during which period a precipitate formed. The volatile components were removed in vacuo and the residue obtained was extracted into benzene (ca 25 mL). The solvent was removed from the extract in vacuo resulting in [Tism$^{Pr^jBenz}$]H as a white powder (610 mg, 96% yield). Colorless crystals of [Tism$^{Pr^jBenz}$]H suitable for X-ray diffraction were obtained via slow evaporation of a benzene solution.

$^1$H NMR (C$_6$D$_6$):
0.55 [s, 18H, (C$_6$H$_4$N$_2$CH(C$\underline{H}_3$)$_2$CSi(CH$_3$)$_2$)$_3$CH],
1.40 [d, J=7 Hz, 18H, (C$_6$H$_4$N$_2$CH(C$\underline{H}_3$)$_2$CSi(CH$_3$)$_2$)$_3$CH],
2.30 [s, 1H, (C$_6$H$_4$N$_2$CH(CH$_3$)$_2$CSi(CH$_3$)$_2$)$_3$C$\underline{H}$],
5.09 [sep, J=7 Hz, 3H, (C$_6$H$_4$N$_2$C$\underline{H}$(CH$_3$)$_2$CSi(CH$_3$)$_2$)$_3$CH],
7.14-7.23 [m, 6H, (C$_6$$\underline{H}_4$N$_2$CH(CH$_3$)$_2$CSi(CH$_3$)$_2$)$_3$CH],
7.38 [d, J=8 Hz, 3H, (C$_6$$\underline{H}_4$N$_2$CH(CH$_3$)$_2$CSi(CH$_3$)$_2$)$_3$CH],
8.04 [d, J=8 Hz, 3H, (C$_6$$\underline{H}_4$N$_2$CH(CH$_3$)$_2$CSi(CH$_3$)$_2$)$_3$CH].
$^{13}$C{$^1$H} NMR (C$_6$D$_6$):
−1.22 [s, 1C, (C$_6$H$_4$N$_2$CH(CH$_3$)$_2$CSi(CH$_3$)$_2$)$_3$CH],
1.89 [s, 6C, (C$_6$H$_4$N$_2$CH(CH$_3$)$_2$CSi(CH$_3$)$_2$)$_3$CH],
21.49 [s, 6C, (C$_6$H$_4$N$_2$CH(CH$_3$)$_2$CSi(CH$_3$)$_2$)$_3$CH],
49.85 [s, 3C, (C$_6$H$_4$N$_2$CH(CH$_3$)$_2$CSi(CH$_3$)$_2$)$_3$CH],
112.69 [s, 3C, (C$_6$H$_4$N$_2$CH(CH$_3$)$_2$CSi(CH$_3$)$_2$)$_3$CH],
121.13 [s, 3C, (C$_6$H$_4$N$_2$CH(CH$_3$)$_2$CSi(CH$_3$)$_2$)$_3$CH],
121.73 [s, 3C, (C$_6$H$_4$N$_2$CH(CH$_3$)$_2$CSi(CH$_3$)$_2$)$_3$CH],
122.49 [s, 3C, (C$_6$H$_4$N$_2$CH(CH$_3$)$_2$CSi(CH$_3$)$_2$)$_3$CH],
134.84 [s, 3C, (C$_6$H$_4$N$_2$CH(CH$_3$)$_2$CSi(CH$_3$)$_2$)$_3$CH],
146.98 [s, 3C, (C$_6$H$_4$N$_2$CH(CH$_3$)$_2$CSi(CH$_3$)$_2$)$_3$CH],
159.75 [s, 3C, (C$_6$H$_4$N$_2$CH(CH$_3$)$_2$CSi(CH$_3$)$_2$)$_3$CH].

$^{29}$Si NMR (C$_6$D$_6$): −7.32 [s, 3Si, (C$_6$H$_4$N$_2$CH(CH$_3$)$_2$CSi(CH$_3$)$_2$)$_3$CH].

IR Data (cm$^{-1}$): 2979 (w), 1459 (m), 1394 (w), 1340 (s), 1321 (m), 1266 (m) 1162 (w), 1131 (w) 1105 (w), 1060 (m), 1014 (m), 834 (s), 820 (vs), 775 (s), 740 (vs), 681 (vs).

Conversion of [Tism$^{Pr^jBenz}$]H to [Tism$^{Pr^jBenz}$]Li

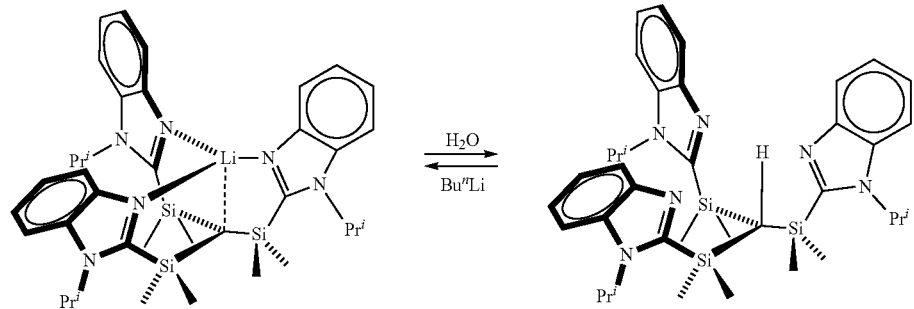

A solution of [Tism$^{Pr^jBenz}$]H (30 mg, 0.045 mmol) in THF (ca 2 mL) was treated with Bu$^n$Li (0.05 mL, 1.6 M in hexanes). The mixture was stirred for one hour, during which period the solution turned light orange. The volatile components were removed in vacuo and the formation of [Tism$^{Pr^jBenz}$]Li was demonstrated by $^1$H NMR spectroscopy.

Preparation of [Tism$^{Pr^jBenz}$]MgMe

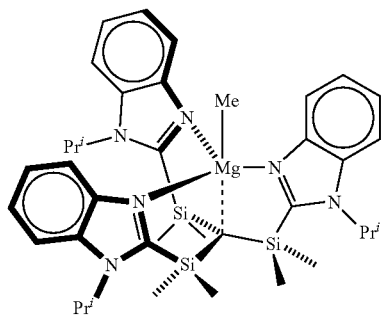

A solution of [Tism$^{Pr^jBenz}$]H (400 mg, 0.601 mmol) in benzene (ca 20 mL) was treated with Me$_2$Mg (40 mg, 0.736 mmol). The mixture was stirred for 20 minutes, after which the mixture was filtered and the filtrate was lyophilized to afford [Tism$^{Pr^jBenz}$]MgMe as a white powder (405 mg, 96% yield). Colorless crystals of [Tism$^{Pr^jBenz}$]MgMe suitable for X-ray diffraction were obtained via slow evaporation of a benzene solution.

$^1$H NMR (C$_6$D$_6$):

0.20 [s, 3H, (C$_6$H$_4$N$_2$CH(CH$_3$)$_2$CSi(CH$_3$)$_2$)$_3$CMgC$\underline{H}_3$], 0.45 [s, 18H, (C$_6$H$_4$N$_2$CH(CH$_3$)$_2$CSi(C$\underline{H}_3$)$_2$)$_3$CMgCH$_3$], 1.16 [d, J=7 Hz, 18H, (C$_6$H$_4$N$_2$CH(C$\underline{H}_3$)$_2$CSi(CH$_3$)$_2$)$_3$CMgCH$_3$], 4.66 [sep, J=7 Hz, 3H, (C$_6$H$_4$N$_2$C$\underline{H}$(CH$_3$)$_2$CSi(CH$_3$)$_2$)$_3$CMgCH$_3$], 7.01-7.19 [m, 9H, (C$_6$$\underline{H}_4$N$_2$CH(CH$_3$)$_2$CSi(CH$_3$)$_2$)$_3$CMgCH$_3$], 8.83 [d, J=8 Hz, 3H, (C$_6$$\underline{H}_4$N$_2$CH(CH$_3$)$_2$CSi(CH$_3$)$_2$)$_3$CMgCH$_3$].

$^{13}$C{$^1$H} NMR (C$_6$D$_6$):

0.57 [s, 1C, (C$_6$H$_4$N$_2$CH(CH$_3$)$_2$CSi(CH$_3$)$_2$)$_3$CMgCH$_3$], 4.54 [s, 6C, (C$_6$H$_4$N$_2$CH(CH$_3$)$_2$CSi(CH$_3$)$_2$)$_3$CMgCH$_3$], 21.01 [s, 6C, (C$_6$H$_4$N$_2$CH(CH$_3$)$_2$CSi(CH$_3$)$_2$)$_3$CMgCH$_3$], 50.09 [s, 3C, (C$_6$H$_4$N$_2$CH(CH$_3$)$_2$CSi(CH$_3$)$_2$)$_3$CMgCH$_3$], 112.24 [s, 3C, (C$_6$H$_4$N$_2$CH(CH$_3$)$_2$CSi(CH$_3$)$_2$)$_3$CMgCH$_3$], 122.54 [s, 3C, (C$_6$H$_4$N$_2$CH(CH$_3$)$_2$CSi(CH$_3$)$_2$)$_3$CMgCH$_3$], 122.69 [s, 3C, (C$_6$H$_4$N$_2$CH(CH$_3$)$_2$CSi(CH$_3$)$_2$)$_3$CMgCH$_3$], 122.90 [s, 3C, (C$_6$H$_4$N$_2$CH(CH$_3$)$_2$CSi(CH$_3$)$_2$)$_3$CMgCH$_3$], 134.55 [s, 3C, (C$_6$H$_4$N$_2$CH(CH$_3$)$_2$CSi(CH$_3$)$_2$)$_3$CMgCH$_3$], 144.78 [s, 3C, (C$_6$H$_4$N$_2$CH(CH$_3$)$_2$CSi(CH$_3$)$_2$)$_3$CMgCH$_3$], 166.94 [s, 3C, (C$_6$H$_4$N$_2$CH(CH$_3$)$_2$CSi(CH$_3$)$_2$)$_3$CMgCH$_3$], not observed [(C$_6$H$_4$N$_2$CH(CH$_3$)$_2$CSi(CH$_3$)$_2$)$_3$CMgCH$_3$].

$^{29}$Si NMR (C$_6$D$_6$): −12.69 [s, 3Si, (C$_6$H$_4$N$_2$CH(CH$_3$)$_2$CSi(CH$_3$)$_2$)$_3$CMgCH$_3$].

Anal. calc. for [Tism$^{Pr^jBenz}$]MgMe.C$_6$H$_6$: C, 67.6%; H, 7.7%; N, 10.8%. Found: C, 66.8%; H, 7.6%; N, 10.4%.

IR Data (ATR, cm$^{-1}$): 2973 (m), 1462 (m), 1391 (w), 1340 (m), 1257 (m), 1060 (m), 1011 (m), 948 (s), 821 (vs), 739 (vs), 676 (s).

Preparation of [κ$^3$-Tism$^{Pr^jBenz}$]ZnMe

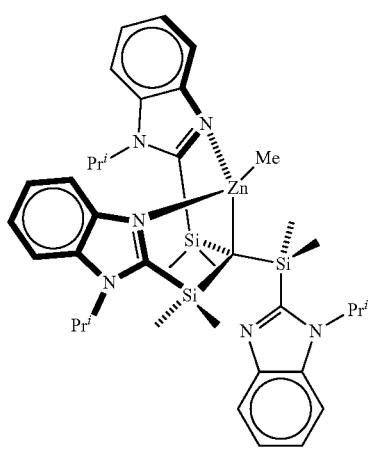

A solution of [Tism$^{Pr^jBenz}$]H (30 mg, 0.045 mmol) in benzene (ca. 0.7 mL) was treated with Me$_2$Zn (15 mg, 0.157 mmol) in an NMR tube equipped with a J. Young valve and the solution was heated at 60° C. for 1 day. After this period the mixture was filtered and the filtrate was lyophilized to afford [κ$^3$-Tism$^{Pr^jBenz}$]ZnMe as a white powder (18 mg, 54%). Colorless crystals of [κ$^3$-Tism$^{Pr^jBenz}$]ZnMe suitable for X-ray diffraction were obtained by vapor diffusion of pentane into a solution in benzene.

$^1$H NMR (C$_6$D$_6$):
  0.31 [s, 3H, (C$_6$H$_4$N$_2$CH(CH$_3$)$_2$CSi(CH$_3$)$_2$)$_3$CZnCH$_3$],
  0.76 [s, 18H, (C$_6$H$_4$N$_2$CH(CH$_3$)$_2$CSi(CH$_3$)$_2$)$_3$CZnCH$_3$],
  1.14 [d, J=6.9 Hz, 18H, (C$_6$H$_4$N$_2$CH(CH$_3$)$_2$CSi(CH$_3$)$_2$)$_3$CZnCH$_3$],
  4.70 [sept, J=7 Hz, 3H (C$_6$H$_4$N$_2$CH(CH$_3$)$_2$CSi(CH$_3$)$_2$)$_3$CZnCH$_3$],
  7.05 [m, 3H, (C$_6$H$_4$N$_2$CH(CH$_3$)$_2$CSi(CH$_3$)$_2$)$_3$CZnCH$_3$],
  7.23 [d, J=8.2 Hz, (C$_6$H$_4$N$_2$CH(CH$_3$)$_2$CSi(CH$_3$)$_2$)$_3$CZnCH$_3$],
  8.22 [d, J=8 Hz, (C$_6$H$_4$N$_2$CH(CH$_3$)$_2$CSi(CH$_3$)$_2$)$_3$CZnCH$_3$].

$^{13}$C NMR (C$_6$D$_6$):
  −10.51 [s, 1C, (C$_6$H$_4$N$_2$CH(CH$_3$)$_2$CSi(CH$_3$)$_2$)$_3$CZnCH$_3$],
  4.98 [s, 6C, (C$_6$H$_4$N$_2$CH(CH$_3$)$_2$CSi(CH$_3$)$_2$)$_3$CZnCH$_3$],
  21.15 [s, 6C, (C$_6$H$_4$N$_2$CH(CH$_3$)$_2$CSi(CH$_3$)$_2$)$_3$CZnCH$_3$],
  49.97 [s, 3C, (C$_6$H$_4$N$_2$CH(CH$_3$)$_2$CSi(CH$_3$)$_2$)$_3$CZnCH$_3$],
  112.92 [s, 3C, (C$_6$H$_4$N$_2$CH(CH$_3$)$_2$CSi(CH$_3$)$_2$)$_3$CZnCH$_3$],
  119.85 [s, 3C, (C$_6$H$_4$N$_2$CH(CH$_3$)$_2$CSi(CH$_3$)$_2$)$_3$CZnCH$_3$],
  122.38 [s, 3C, (C$_6$H$_4$N$_2$CH(CH$_3$)$_2$CSi(CH$_3$)$_2$)$_3$CZnCH$_3$],
  122.50 [s, 3C, (C$_6$H$_4$N$_2$CH(CH$_3$)$_2$CSi(CH$_3$)$_2$)$_3$CZnCH$_3$],
  134.68 [s, 3C, (C$_6$H$_4$N$_2$CH(CH$_3$)$_2$CSi(CH$_3$)$_2$)$_3$CZnCH$_3$],
  144.59 [s, 3C, (C$_6$H$_4$N$_2$CH(CH$_3$)$_2$CSi(CH$_3$)$_2$)$_3$CZnCH$_3$],
  166.41 [s, 3C, (C$_6$H$_4$N$_2$CH(CH$_3$)$_2$CSi(CH$_3$)$_2$)$_3$CZnCH$_3$],
  not observed [(C$_6$H$_4$N$_2$CH(CH$_3$)$_2$CSi(CH$_3$)$_2$)$_3$CZnCH$_3$].

$^{29}$Si NMR (C$_6$D$_6$): −7.97 [s, (C$_6$H$_4$N$_2$CH(CH$_3$)$_2$CSi(CH$_3$)$_2$)$_3$CZnCH$_3$].

Anal. calc. for [k$^3$-Tism$^{Pr^jBenz}$]ZnMe: C, 61.3%; H, 7.3%; N, 11.3%. Found: C, 61.7%; H, 6.7%; N, 10.2%.

IR Data (cm$^{-1}$): 2969 (w), 2896 (w), 1464 (m), 1390 (m), 1371 (m), 1354 (m), 1290 (w), 1252 (m), 1132 (w), 1066 (m), 919 (s), 890 (s), 813 (s), 739 (vs), 698 (m), 645 (m).

Preparation of [Tism$^{Pr^jBenz}$]Cu

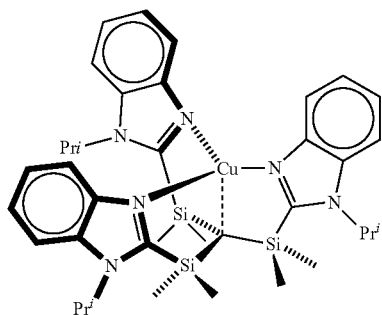

A solution of [(Me$_3$P)CuCl]$_4$ (16 mg, 0.023 mmol) in benzene (ca. 1.5 mL) was treated with [Tism$^{Pr^jBenz}$]Li (50 mg, 0.075 mmol), thereby resulting in the formation of a yellow suspension. The suspension was stirred for one day, after which period, the solvent was removed in vacuo. The solid was washed with benzene (2×0.5 mL), resulting in [Tism$^{Pr^jBenz}$]Cu as a yellow solid (16 mg, 30%). Yellow crystals suitable for X-ray diffraction were obtained by vapor diffusion of pentane into a solution in benzene.

$^1$H NMR (C$_6$D$_6$):
  0.58 [s, 18H, (C$_6$H$_4$N$_2$CH(CH$_3$)$_2$CSi(CH$_3$)$_2$)$_3$CCu],
  1.23 [d, J=7 Hz, 18H, (C$_6$H$_4$N$_2$CH(CH$_3$)$_2$CSi(CH$_3$)$_2$)$_3$CCu],
  4.77 [sept, J=7 Hz, 3H, (C$_6$H$_4$N$_2$CH(CH$_3$)$_2$CSi(CH$_3$)$_2$)$_3$CCu],
  7.02 [m, 3H, (C$_6$H$_4$N$_2$CH(CH$_3$)$_2$CSi(CH$_3$)$_2$)$_3$CCu],
  7.11 [m, 3H, (C$_6$H$_4$N$_2$CH(CH$_3$)$_2$CSi(CH$_3$)$_2$)$_3$CCu],
  7.26 [d, J=8.1 Hz, 3H, (C$_6$H$_4$N$_2$CH(CH$_3$)$_2$CSi(CH$_3$)$_2$)$_3$CCu],
  8.29 [d, J=8 Hz, 3H, (C$_6$H$_4$N$_2$CH(CH$_3$)$_2$CSi(CH$_3$)$_2$)$_3$CCu].

$^{13}$C NMR (C$_6$D$_6$):
  5.65 (6C, (C$_6$H$_4$N$_2$CH(CH$_3$)$_2$CSi(CH$_3$)$_2$)$_3$CCu],
  21.24 [6C, (C$_6$H$_4$N$_2$CH(CH$_3$)$_2$CSi(CH$_3$)$_2$)$_3$CCu],
  49.64 [3C, (C$_6$H$_4$N$_2$CH(CH$_3$)$_2$CSi(CH$_3$)$_2$)$_3$CCu],
  112.64 [3C, (C$_6$H$_4$N$_2$CH(CH$_3$)$_2$CSi(CH$_3$)$_2$)$_3$CCu],
  120.21 [3C, (C$_6$H$_4$N$_2$CH(CH$_3$)$_2$CSi(CH$_3$)$_2$)$_3$CCu],
  121.91 [30, (C$_6$H$_4$N$_2$CH(CH$_3$)$_2$CSi(CH$_3$)$_2$)$_3$CCu],
  122.02 [3C, (C$_6$H$_4$N$_2$CH(CH$_3$)$_2$CSi(CH$_3$)$_2$)$_3$CCu],
  134.13 [3C, (C$_6$H$_4$N$_2$CH(CH$_3$)$_2$CSi(CH$_3$)$_2$)$_3$CCu],
  144.34 [3C, (C$_6$H$_4$N$_2$CH(CH$_3$)$_2$CSi(CH$_3$)$_2$)$_3$CCu],
  168.12 [3C, (C$_6$H$_4$N$_2$CH(CH$_3$)$_2$CSi(CH$_3$)$_2$)$_3$CCu],
  not observed [(C$_6$H$_4$N$_2$CH(CH$_3$)$_2$CSi(CH$_3$)$_2$)$_3$CCu].

$^{29}$Si NMR (C$_6$D$_6$): −14.90 [s, 3Si, (C$_6$H$_4$N$_2$CH(CH$_3$)$_2$CSi(CH$_3$)$_2$)$_3$CCu].

Anal. calc. for [Tism$^{Pr^jBenz}$]Cu: C, 61.1%; H, 7.1%; N, 11.6%. Found: C, 60.8%; H, 7.0%; N, 11.4%.

IR Data (cm$^{-1}$): 3053 (w), 2963 (w), 1463 (m), 1389 (w), 1372 (w), 1344 (m), 1321 (w), 1286 (w), 1249 (m), 1159 (w), 1133 (w), 1105 (m), 954 (vs), 822 (s), 791 (s), 738 (vs), 669 (m).

Preparation of [Tism$^{Pr^jBenz}$]NiBr

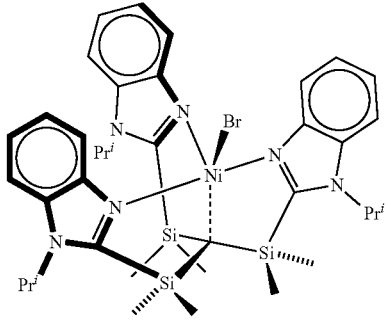

A mixture of [Tism$^{Pr^jBenz}$]Li (50 mg, 0.075 mmol) and (Ph$_3$P)$_2$NiBr$_2$ (55 mg, 0.074 mmol) was dissolved in THF (ca. 2 mL) and the green solution obtained was allowed to stand over a period of 2 days, during which period green crystals of [Tism$^{Pr^jBenz}$]NiBr suitable for X-ray diffraction were deposited. The crystals were isolated by decanting the mother liquor, washed sequentially with THF (ca. 1 mL) and pentane (ca. 1 mL), and dried in vacuo to afford [Tism$^{Pr^jBenz}$]NiBr (37 mg, 61%).

$^1$H NMR (C$_6$D$_6$): 1.53 [bs], 4.85 [bs], 5.59 [bs], 8.09 [bs], 10.21 [bs], 22.52 [bs], 29.88 [bs]. Anal. calc. for [Tism$^{Pr^jBenz}$]NiBr: C, 55.4%; H, 6.4%; N, 10.5%. Found: C, 54.1%; H, 6.6%; N, 9.1%.

IR Data (cm$^{-1}$): 2972 (w), 2943 (w), 2877 (w), 1466 (m), 1392 (m), 1363 (m), 1252 (m), 1158 (w), 1133 (w), 1068 (m), 933 (s), 896 (s), 829 (s), 815 (s), 766 (m), 737 (vs), 695 (m).

Preparation of [Tism$^{Pr^jBenz}$]MgF

Two preparation methods were employed:

(i) A solution of [Tism$^{Pr^jBenz}$]MgMe (10 mg, 0.014 mmol) in THF (ca 0.7 mL) was treated with Me$_3$SnF (2 mg, 0.011 mmol). The solution was stirred at room temperature for 10 minutes, over which period all of the Me$_3$SnF dissolves. After this period, the solution was allowed to stand at room temperature for 16 hours, resulting in the deposition of colorless crystals of [Tism$^{Pr^jBenz}$]MgF suitable for X-ray diffraction, which were washed with benzene and dried in vacuo (6 mg, 60% yield).

(ii) A solution of [Tism$^{Pr^jBenz}$]MgH (3 mg, 0.004 mmol) in benzene (ca 0.7 mL) was treated with Me$_3$SnF (2 mg, 0.011 mmol) resulting in the formation of a white suspension. The reaction was monitored by $^1$H and $^{19}$F NMR spectroscopy, thereby demonstrating the immediate formation of [Tism$^{Pr^jBenz}$]MgF and Me$_3$SnH.

Anal. calcd. for [Tism$^{Pr^jBenz}$]MgF C$_4$H$_8$O: C, 63.2%; H, 7.6%; N, 10.8%. Found: C, 63.0%; H, 7.5%; N, 10.2%.

$^1$H NMR (C$_6$D$_6$):
0.40 [s, 18H, (C$_6$H$_4$N$_2$CH(CH$_3$)$_2$CSi(CH$_3$)$_2$)$_3$CMgF],
1.20 [d, J=7 Hz, 18H, (C$_6$H$_4$N$_2$CH(C$\underline{H}_3$)$_2$CSi(CH$_3$)$_2$)$_3$CMgF],
4.67 [sep, J=7 Hz, 3H, (C$_6$H$_4$N$_2$C$\underline{H}$(CH$_3$)$_2$CSi(CH$_3$)$_2$)$_3$CMgF],
7.04 [t, J=7 Hz, 3H, (C$_6$$\underline{H}_4$N$_2$CH(CH$_3$)$_2$CSi(CH$_3$)$_2$)$_3$CMgF],
7.19 [d, J=7 Hz, 3H, (C$_6$$\underline{H}_4$N$_2$CH(CH$_3$)$_2$CSi(CH$_3$)$_2$)$_3$CMgF],
7.22 [t, J=7 Hz, 3H, (C$_6$$\underline{H}_4$N$_2$CH(CH$_3$)$_2$CSi(CH$_3$)$_2$)$_3$CMgF],
9.97 [dd, J=8 Hz, J=3 Hz, 3H, (C$_6$$\underline{H}_4$N$_2$CH(CH$_3$)$_2$CSi(CH$_3$)$_2$)$_3$CMgF].

$^{13}$C{$^1$H} NMR (C$_6$D$_6$):
4.85 [s, 6C, (C$_6$H$_4$N$_2$CH(CH$_3$)$_2$CSi(CH$_3$)$_2$)$_3$CMgF],
21.14 [s, 6C, (C$_6$H$_4$N$_2$CH(CH$_3$)$_2$CSi(CH$_3$)$_2$)$_3$CMgF],
50.03 [s, 3C, (C$_6$H$_4$N$_2$CH(CH$_3$)$_2$CSi(CH$_3$)$_2$)$_3$CMgF],
111.79 [s, 3C, (C$_6$H$_4$N$_2$CH(CH$_3$)$_2$CSi(CH$_3$)$_2$)$_3$CMgF],
122.97 [s, 3C, (C$_6$H$_4$N$_2$CH(CH$_3$)$_2$CSi(CH$_3$)$_2$)$_3$CMgF],
123.06 [s, 3C, (C$_6$H$_4$N$_2$CH(CH$_3$)$_2$CSi(CH$_3$)$_2$)$_3$CMgF],
124.07 [d, J=15 Hz, 3C, (C$_6$H$_4$N$_2$CH(CH$_3$)$_2$CSi(CH$_3$)$_2$)$_3$CMgF],
134.02 [s, 3C, (C$_6$H$_4$N$_2$CH(CH$_3$)$_2$CSi(CH$_3$)$_2$)$_3$CMgF],
145.14 [s, 3C, (C$_6$H$_4$N$_2$CH(CH$_3$)$_2$CSi(CH$_3$)$_2$)$_3$CMgF],
167.53 [s, 3C, (C$_6$H$_4$N$_2$CH(CH$_3$)$_2$CSi(CH$_3$)$_2$)$_3$CMgF],
not observed [(C$_6$H$_4$N$_2$CH(CH$_3$)$_2$CSi(CH$_3$)$_2$)$_3$CMgF].

$^{29}$Si NMR (C$_6$D$_6$): −12.18 [s, 3Si, (C$_6$H$_4$N$_2$CH(CH$_3$)$_2$C$\underline{Si}$(CH$_3$)$_2$)$_3$CMgF].

$^{19}$F NMR (C$_6$D$_6$): −152.4 [s, 1F, (C$_6$H$_4$N$_2$CH(CH$_3$)$_2$CSi(CH$_3$)$_2$)$_3$CMgF].

IR Data (ATR, cm$^{-1}$): 1356 (m), 943 (vs), 825 (s), 790 (s), 742 (vs), 697 (m), 675 (m), 530 (m), 497 (m), 436 (m).

Preparation of [Tism$^{Pr^jBenz}$]MgCl

Two preparation methods were employed:

(i) A solution of [Tism$^{Pr^jBenz}$]MgMe (30 mg, 0.043 mmol) in C$_6$D$_6$ (ca 0.7 mL) was treated with Me$_3$SnCl (10 mg, 0.050 mmol). The mixture was filtered after 10 minutes and the filtrate was lyophilized to afford [Tism$^{Pr^jBenz}$]MgCl as a white powder (23 mg, 74% yield). Colorless crystals suitable for X-ray diffraction were obtained via vapor diffusion of pentane into a concentrated benzene solution.

(ii) A solution of [Tism$^{Pr^jBenz}$]MgH (2 mg, 0.003 mmol) in C$_6$D$_6$ (ca 0.7 mL) was treated with Me$_3$SnCl. The reaction was monitored by $^1$H NMR spectroscopy, thereby demonstrating the immediate formation of [Tism$^{Pr^jBenz}$]MgCl and Me$_3$SnH.

$^1$H NMR (C$_6$D$_6$):
0.36 [s, 18H, (C$_6$H$_4$N$_2$CH(CH$_3$)$_2$CSi(C$\underline{H}_3$)$_2$)$_3$CMgCl],
1.13 [d, J=7 Hz, 18H, (C$_6$H$_4$N$_2$CH(C$\underline{H}_3$)$_2$CSi(CH$_3$)$_2$)$_3$CMgCl],
4.59 [sep, J=7 Hz, 3H, (C$_6$H$_4$N$_2$C$\underline{H}$(CH$_3$)$_2$CSi(CH$_3$)$_2$)$_3$CMgCl],
7.02 [t, J=7 Hz, 3H, (C$_6$$\underline{H}_4$N$_2$CH(CH$_3$)$_2$CSi(CH$_3$)$_2$)$_3$CMgCl],
7.13 [m, 6H, (C$_6$$\underline{H}_4$N$_2$CH(CH$_3$)$_2$CSi(CH$_3$)$_2$)$_3$CMgCl],
9.92 [d, J=8 Hz, 3H, (C$_6$$\underline{H}_4$N$_2$CH(CH$_3$)$_2$CSi(CH$_3$)$_2$)$_3$CMgCl].

$^{13}$C{$^1$H} NMR (C$_6$D$_6$):
4.25 [s, 6C, (C$_6$H$_4$N$_2$CH(CH$_3$)$_2$CSi(CH$_3$)$_2$)$_3$CMgCl],
20.97 [s, 6C, (C$_6$H$_4$N$_2$CH(CH$_3$)$_2$CSi(CH$_3$)$_2$)$_3$CMgCl],
50.21 [s, 3C, (C$_6$H$_4$N$_2$CH(CH$_3$)$_2$CSi(CH$_3$)$_2$)$_3$CMgCl],
111.92 [s, 3C, (C$_6$H$_4$N$_2$CH(CH$_3$)$_2$CSi(CH$_3$)$_2$)$_3$CMgCl],
122.80 [s, 3C, (C$_6$H$_4$N$_2$CH(CH$_3$)$_2$CSi(CH$_3$)$_2$)$_3$CMgCl],
123.02 [s, 3C, (C$_6$H$_4$N$_2$CH(CH$_3$)$_2$CSi(CH$_3$)$_2$)$_3$CMgCl],
124.53 [s, 3C, (C$_6$H$_4$N$_2$CH(CH$_3$)$_2$CSi(CH$_3$)$_2$)$_3$CMgCl],
134.32 [s, 3C, (C$_6$H$_4$N$_2$CH(CH$_3$)$_2$CSi(CH$_3$)$_2$)$_3$CMgCl],
144.69 [s, 3C, (C$_6$H$_4$N$_2$CH(CH$_3$)$_2$CSi(CH$_3$)$_2$)$_3$CMgCl],
166.83 [s, 3C, (C$_6$H$_4$N$_2$CH(CH$_3$)$_2$CSi(CH$_3$)$_2$)$_3$CMgCl],
not observed [(C$_6$H$_4$N$_2$CH(CH$_3$)$_2$CSi(CH$_3$)$_2$)$_3$CMgCl].

$^{29}$Si NMR (C$_6$D$_6$): −12.19 [s, 3Si, (C$_6$H$_4$N$_2$CH(CH$_3$)$_2$C$\underline{Si}$(CH$_3$)$_2$)$_3$CMgCl].

IR Data (ATR, cm$^{-1}$): 1358 (m), 939 (s), 826 (s), 814 (s), 790 (m), 741 (vs), 695 (m), 559 (m), 531 (m), 440 (m).

Preparation of [Tism$^{Pr^iBenz}$]MgBr

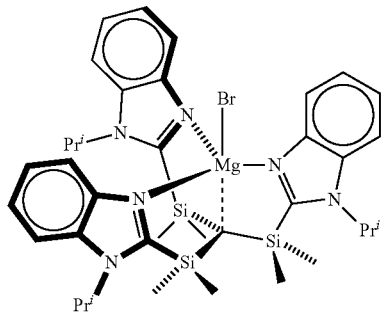

Two preparation methods were employed:

(i) A solution of [Tism$^{Pr^iBenz}$]MgMe (30 mg, 0.043 mmol) in C$_6$D$_6$ (ca 0.7 mL) was treated with Me$_3$SnBr (12 mg, 0.049 mmol). After 10 minutes, the solution was filtered and lyophilized to afford [Tism$^{Pr^iBenz}$]MgBr Or as a white powder (26 mg, 79% yield). Colorless crystals suitable for X-ray diffraction were obtained via vapor diffusion of pentane into a concentrated toluene solution.

(ii) A solution of [Tism$^{Pr^iBenz}$]MgH (2 mg, 0.003 mmol) in C$_6$D$_6$ (ca 0.7 mL) was treated with Me$_3$SnBr. The reaction was monitored by $^1$H NMR spectroscopy, thereby demonstrating the immediate formation of [Tism$^{Pr^iBenz}$]MgBr and Me$_3$SnH.

Anal. calcd. for [Tism$^{Pr^iBenz}$]MgBr: C, 57.8%; H, 6.7%; N, 10.9%. Found: C, 56.2%; H, 6.9%; N, 10.3%.

$^1$H NMR (C$_6$D$_6$):

0.35 [s, 18H, (C$_6$H$_4$N$_2$CH(CH$_3$)$_2$CSi(C$\underline{H}_3$)$_2$)$_3$CMgBr], 1.12 [d, J=7 Hz, 18H, (C$_6$H$_4$N$_2$CH(C$\underline{H}_3$)$_2$CSi(CH$_3$)$_2$)$_3$CMgBr], 4.57 [sep, J=7 Hz, 3H, (C$_6$H$_4$N$_2$C$\underline{H}$(CH$_3$)$_2$CSi(CH$_3$)$_2$)$_3$CMgBr], 7.01 [t, J=7 Hz, 3H, (C$_6$$\underline{H}_4$N$_2$CH(CH$_3$)$_2$CSi(CH$_3$)$_2$)$_3$CMgBr], 7.10 [t, J=7 Hz, 3H, (C$_6$$\underline{H}_4$N$_2$CH(CH$_3$)$_2$CSi(CH$_3$)$_2$)$_3$CMgBr], 7.14 [d, J=8 Hz, 3H, (C$_6$$\underline{H}_4$N$_2$CH(CH$_3$)$_2$CSi(CH$_3$)$_2$)$_3$CMgBr], 9.94 [d, J=8 Hz, 3H, (C$_6$$\underline{H}_4$N$_2$CH(CH$_3$)$_2$CSi(CH$_3$)$_2$)$_3$CMgBr].

$^{13}$C{$^1$H} NMR (C$_6$D$_6$):

4.13 [s, 6C, (C$_6$H$_4$N$_2$CH(CH$_3$)$_2$CSi(CH$_3$)$_2$)$_3$CMgBr], 20.94 [s, 6C, (C$_6$H$_4$N$_2$CH(CH$_3$)$_2$CSi(CH$_3$)$_2$)$_3$CMgBr], 50.28 [s, 3C, (C$_6$H$_4$N$_2$CH(CH$_3$)$_2$CSi(CH$_3$)$_2$)$_3$CMgBr], 111.94 [s, 3C, (C$_6$H$_4$N$_2$CH(CH$_3$)$_2$CSi(CH$_3$)$_2$)$_3$CMgBr], 122.64 [s, 3C, (C$_6$H$_4$N$_2$CH(CH$_3$)$_2$CSi(CH$_3$)$_2$)$_3$CMgBr], 123.08 [s, 3C, (C$_6$H$_4$N$_2$CH(CH$_3$)$_2$CSi(CH$_3$)$_2$)$_3$CMgBr], 124.79 [s, 3C, (C$_6$H$_4$N$_2$CH(CH$_3$)$_2$CSi(CH$_3$)$_2$)$_3$CMgBr], 134.42 [s, 3C, (C$_6$H$_4$N$_2$CH(CH$_3$)$_2$CSi(CH$_3$)$_2$)$_3$CMgBr], 144.48 [s, 3C, (C$_6$H$_4$N$_2$CH(CH$_3$)$_2$CSi(CH$_3$)$_2$)$_3$CMgBr], 166.63 [s, 3C, (C$_6$H$_4$N$_2$CH(CH$_3$)$_2$CSi(CH$_3$)$_2$)$_3$CMgBr], not observed [(C$_6$H$_4$N$_2$CH(CH$_3$)$_2$CSi(CH$_3$)$_2$)$_3$CMgBr].

$^{29}$Si NMR (C$_6$D$_6$): −12.13 [s, 3Si, (C$_6$H$_4$N$_2$CH(CH$_3$)$_2$C$\underline{Si}$(CH$_3$)$_2$)$_3$CMgBr].

IR Data (ATR, cm$^{-1}$): 1358 (w), 939 (m), 826 (m), 813 (m), 790 (w), 741 (s), 695 (w), 560 (w), 531 (w), 442 (w).

Preparation of [Tism$^{Pr^iBenz}$]MgI

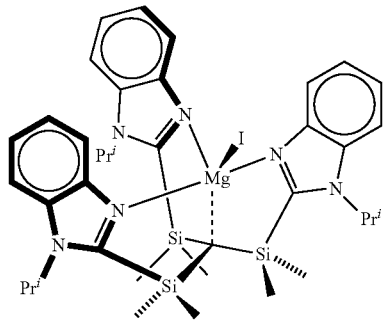

Two preparation methods were employed:

(i) A solution of [Tism$^{Pr^iBenz}$]MgMe (30 mg, 0.043 mmol) in C$_6$D$_6$ (ca 0.7 mL) was treated with a solution of Me$_3$SnI (ca 1 equiv in C$_6$D$_6$). The solution was filtered after 10 minutes, and lyophilized to afford [Tism$^{Pr^iBenz}$]MgI as a white powder (25 mg, 72% yield). Colorless crystals suitable for X-ray diffraction were obtained via vapor diffusion of pentane into a concentrated benzene solution.

(ii) A solution of [Tism$^{Pr^iBenz}$]MgH (2 mg, 0.003 mmol) in C$_6$D$_6$ (ca 0.7 mL) was treated with Me$_3$SnI (ca. 1 equiv in C$_6$D$_6$). The reaction was monitored by 1H NMR spectroscopy, thereby demonstrating the immediate formation of [Tism$^{Pr^iBenz}$]MgI and Me$_3$SnH.

$^1$H NMR (C$_6$D$_6$):

0.34 [s, 18H, (C$_6$H$_4$N$_2$CH(CH$_3$)$_2$CSi(C$\underline{H}_3$)$_2$)$_3$CMgI], 1.10 [d, J=7 Hz, 18H, (C$_6$H$_4$N$_2$CH(C$\underline{H}_3$)$_2$CSi(CH$_3$)$_2$)$_3$CMgI], 4.55 [sep, J=7 Hz, 3H, (C$_6$H$_4$N$_2$C$\underline{H}$(CH$_3$)$_2$CSi(CH$_3$)$_2$)$_3$CMgI], 6.99 [t, J=7 Hz, 3H, (C$_6$$\underline{H}_4$N$_2$CH(CH$_3$)$_2$CSi(CH$_3$)$_2$)$_3$CMgI], 7.11 [m, 6H, (C$_6$$\underline{H}_4$N$_2$CH(CH$_3$)$_2$CSi(CH$_3$)$_2$)$_3$CMgI], 9.86 [d, J=8 Hz, 3H, (C$_6$$\underline{H}_4$N$_2$CH(CH$_3$)$_2$CSi(CH$_3$)$_2$)$_3$CMgI].

$^{13}$C{$^1$H} NMR (C$_6$D$_6$):

4.21 [s, 6C, (C$_6$H$_4$N$_2$CH(CH$_3$)$_2$CSi(CH$_3$)$_2$)$_3$CMgI], 20.92 [s, 6C, (C$_{61-14}$N$_2$CH(CH$_3$)$_2$CSi(CH$_3$)$_2$)$_3$CMgI], 50.34 [s, 3C, (C$_6$H$_4$N$_2$CH(CH$_3$)$_2$CSi(CH$_3$)$_2$)$_3$CMgI], 112.04 [s, 3C, (C$_6$H$_4$N$_2$CH(CH$_3$)$_2$CSi(CH$_3$)$_2$)$_3$CMgI], 122.33 [s, 3C, (C$_6$H$_4$N$_2$CH(CH$_3$)$_2$CSi(CH$_3$)$_2$)$_3$CMgI], 123.15 [s, 3C, (C$_{61-14}$N$_2$CH(CH$_3$)$_2$CSi(CH$_3$)$_2$)$_3$CMgI], 124.97 [s, 3C, (C$_6$H$_4$N$_2$CH(CH$_3$)$_2$CSi(CH$_3$)$_2$)$_3$CMgI], 134.53 [s, 3C, (C$_6$H$_4$N$_2$CH(CH$_3$)$_2$CSi(CH$_3$)$_2$)$_3$CMgI], 144.05 [s, 3C, (C$_6$H$_4$N$_2$CH(CH$_3$)$_2$CSi(CH$_3$)$_2$)$_3$CMgI], 166.32 [s, 3C, (C$_6$H$_4$N$_2$CH(CH$_3$)$_2$CSi(CH$_3$)$_2$)$_3$CMgI], not observed [(C$_6$H$_4$N$_2$CH(CH$_3$)$_2$CSi(CH$_3$)$_2$)$_3$CMgI].

$^{29}$Si NMR (C$_6$D$_6$): −11.81 [s, 3Si, (C$_6$H$_4$N$_2$CH(CH$_3$)$_2$C$\underline{Si}$(CH$_3$)$_2$)$_3$CMgI].

IR Data (ATR, cm$^{-1}$): 1358 (w), 939 (s), 825 (vs), 791 (m), 741 (vs), 695 (m), 650 (m), 634 (m), 560 (m), 530 (m), 443 (m).

Preparation of [Tism$^{Pr^iBenz}$]MgSH

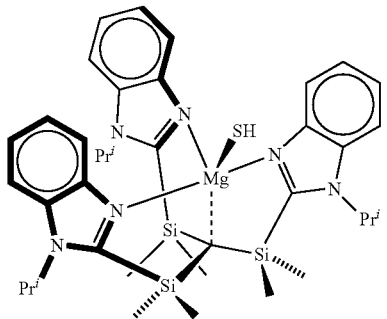

Two preparation methods were employed:

(i) A solution of [Tism$^{Pr^iBenz}$]MgMe (10 mg, 0.014 mmol) in C$_6$D$_6$ (ca 0.7 mL) was treated with H$_2$S (1 atm). Excess H$_2$S was removed by a freeze-pump-thaw cycle, after which, the mixture was filtered. The filtrate was lyophilized to afford [Tism$^{Pr^iBenz}$]MgSH as a white powder (7 mg, 68% yield). Colorless crystals suitable for X-ray diffraction were obtained via vapor diffusion of pentane into a concentrated benzene solution.

(ii) A solution of [Tism$^{Pr^iBenz}$]MgH (5 mg, 0.007 mmol) in C$_6$D$_6$ (ca 0.7 mL) was treated with H$_2$S (1 atm), resulting in a color change from light yellow to colorless. The formation of [Tism$^{Pr^iBenz}$]MgSH was confirmed by $^1$H NMR spectroscopy.

$^1$H NMR (C$_6$D$_6$):

−1.07 [s, 1H, (C$_6$H$_4$N$_2$CH(CH$_3$)$_2$CSi(CH$_3$)$_2$)$_3$CMgS$\underline{H}$], 0.38 [s, 18H, (C$_6$H$_4$N$_2$CH(CH$_3$)$_2$CSi(C$\underline{H}_3$)$_2$)$_3$CMgSH], 1.13 [d, J=7 Hz, 18H, (C$_6$H$_4$N$_2$CH(C$\underline{H}_3$)$_2$CSi(CH$_3$)$_2$)$_3$CMgSH], 7.00 [t, J=7 Hz, 3H, (C$_6\underline{H}_4$N$_2$CH(CH$_3$)$_2$CSi(CH$_3$)$_2$)$_3$CMgSH], 7.08 [t, J=7 Hz, 3H, (C$_6\underline{H}_4$N$_2$CH(CH$_3$)$_2$CSi(CH$_3$)$_2$)$_3$CMgSH], 7.14 [d, J=2 Hz, 3H, (C$_6\underline{H}_4$N$_2$CH(CH$_3$)$_2$CSi(CH$_3$)$_2$)$_3$CMgSH], 9.65 [d, J=8 Hz, 3H, (C$_6\underline{H}_4$N$_2$CH(CH$_3$)$_2$CSi(CH$_3$)$_2$)$_3$CMgSH].

$^{13}$C{$^1$H} NMR (C$_6$D$_6$):

4.32 [s, 6C, (C$_6$H$_4$N$_2$CH(CH$_3$)$_2$CSi(CH$_3$)$_2$)$_3$CMgSH], 20.96 [s, 6C, (C$_6$H$_4$N$_2$CH(CH$_3$)$_2$CSi(CH$_3$)$_2$)$_3$CMgSH], 50.22 [s, 3C, (C$_6$H$_4$N$_2$CH(CH$_3$)$_2$CSi(CH$_3$)$_2$)$_3$CMgSH], 112.06 [s, 3C, (C$_6$H$_4$N$_2$CH(CH$_3$)$_2$CSi(CH$_3$)$_2$)$_3$CMgSH], 122.64 [s, 3C, (C$_6$H$_4$N$_2$CH(CH$_3$)$_2$CSi(CH$_3$)$_2$)$_3$CMgSH], 123.00 [s, 3C, (C$_6$H$_4$N$_2$CH(CH$_3$)$_2$CSi(CH$_3$)$_2$)$_3$CMgSH], 124.11 [s, 3C, (C$_6$H$_4$N$_2$CH(CH$_3$)$_2$CSi(CH$_3$)$_2$)$_3$CMgSH], 134.44 [s, 3C, (C$_6$H$_4$N$_2$CH(CH$_3$)$_2$CSi(CH$_3$)$_2$)$_3$CMgSH], 144.52 [s, 3C, (C$_6$H$_4$N$_2$CH(CH$_3$)$_2$CSi(CH$_3$)$_2$)$_3$CMgSH], 166.61 [s, 3C, (C$_{61-14}$N$_2$CH(CH$_3$)$_2$CSi(CH$_3$)$_2$)$_3$CMgSH], not observed [(C$_6$H$_4$N$_2$CH(CH$_3$)$_2$CSi(CH$_3$)$_2$)$_3$CMgSH].

$^{29}$Si NMR (C$_6$D$_6$): −12.17 [s, 3Si, (C$_6$H$_4$N$_2$CH(CH$_3$)$_2$C$\underline{Si}$(CH$_3$)$_2$)$_3$CMgSH].

IR Data (ATR, cm$^{-1}$): 1358 (w), 1254 (w), 1064 (w), 942 (m), 826 (s), 790 (m), 741 (vs), 695 (w), 675 (w), 438 (m).

Preparation of [Tism$^{Pr^iBenz}$]MgN(H)Ph

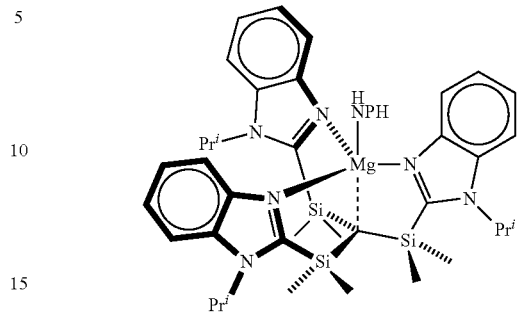

Two preparation methods were employed:

(i) A solution of [Tism$^{Pr^iBenz}$]MgMe (15 mg, 0.021 mmol) in C$_6$D$_6$ (ca 0.7 mL) was treated with aniline (2.0 mg, 0.021 mmol). The solution was filtered after 10 minutes and the filtrate was lyophilized to afford [Tism$^{Pr^iBenz}$]MgN(H)Ph (13 mg, 79% yield). Gold crystals suitable for X-ray diffraction were obtained via vapor diffusion of pentane into a concentrated benzene solution.

(ii) A solution of [Tism$^{Pr^iBenz}$]MgH (3 mg, 0.004 mmol) in C$_6$D$_6$ (ca 0.7 mL) was treated with aniline (0.5 mg, 0.005 mmol). The solution changed from light yellow to colorless and the formation of [Tism$^{Pr^iBenz}$]MgN(H)Ph was confirmed by $^1$H NMR spectroscopy.

Anal. calcd. for [Tism$^{Pr^iBenz}$]MgN(H)Ph: C, 66.2%; H, 7.4%; N, 12.6%. Found: C, 65.5%; H, 7.6%; N, 12.3%.

$^1$H NMR (C$_6$D$_6$):

0.41 [s, 18H, (C$_6$H$_4$N$_2$CH(CH$_3$)$_2$CSi(C$\underline{H}_3$)$_2$)$_3$CMgN(H)Ph], 1.18 [d, J=7 Hz, 18H, (C$_6$H$_4$N$_2$CH(C$\underline{H}_3$)$_2$CSi(CH$_3$)$_2$)$_3$CMgN(H)Ph], 4.44 [s, 1H, (C$_6$H$_4$N$_2$CH(CH$_3$)$_2$CSi(CH$_3$)$_2$)$_3$CMgN($\underline{H}$)Ph], 4.66 [sep, J=7 Hz, 3H, (C$_6$H$_4$N$_2$C$\underline{H}$(CH$_3$)$_2$CSi(CH$_3$)$_2$)$_3$CMgN(H)Ph], 6.31 [t, J=7 Hz, 1H, (C$_6$H$_4$N$_2$CH(CH$_3$)$_2$CSi(CH$_3$)$_2$)$_3$CMgN(H)$\underline{Ph}$], 6.61 [d, J=7 Hz, 2H, (C$_6$H$_4$N$_2$CH(CH$_3$)$_2$CSi(CH$_3$)$_2$)$_3$CMgN(H)$\underline{Ph}$], 6.98 [m, 8H, (C$_6$H$_4$N$_2$CH(CH$_3$)$_2$CSi(CH$_3$)$_2$)$_3$CMgN(H)$\underline{Ph}$], 7.14 [d, J=8 Hz, 3H, (C$_6\underline{H}_4$N$_2$CH(CH$_3$)$_2$ CSi(CH$_3$)$_2$)$_3$CMgN(H)Ph], 8.86 [d, J=8 Hz, 3H, (C$_6\underline{H}_4$N$_2$CH(CH$_3$)$_2$ CSi(CH$_3$)$_2$)$_3$CMgN(H)Ph].

$^{13}$C{$^1$H} NMR (C$_6$D$_6$):

4.57 [s, 6C, (C$_6$H$_4$N$_2$CH(CH$_3$)$_2$CSi(CH$_3$)$_2$)$_3$CMgN(H)Ph], 21.05 [s, 6C, (C$_6$H$_4$N$_2$CH(CH$_3$)$_2$CSi(CH$_3$)$_2$)$_3$CMgN(H)Ph], 50.20 [s, 3C, (C$_6$H$_4$N$_2$CH(CH$_3$)$_2$CSi(CH$_3$)$_2$)$_3$CMgN(H)Ph], 108.99 [s, 1C, (C$_6$H$_4$N$_2$CH(CH$_3$)$_2$CSi(CH$_3$)$_2$)$_3$CMgN(H)Ph], 112.05 [s, 3C, (C$_6$H$_4$N$_2$CH(CH$_3$)$_2$CSi(CH$_3$)$_2$)$_3$CMgN(H)Ph], 116.99 [s, 2C, (C$_6$H$_4$N$_2$CH(CH$_3$)$_2$CSi(CH$_3$)$_2$)$_3$CMgN(H)Ph], 122.74 [s, 1C, (C$_6$H$_4$N$_2$CH(CH$_3$)$_2$CSi(CH$_3$)$_2$)$_3$CMgN(H)Ph], 122.96 [s, 3C, (C$_6$H$_4$N$_2$CH(CH$_3$)$_2$CSi(CH$_3$)$_2$)$_3$CMgN(H)Ph],
123.07 [s, 3C, (C$_6$H$_4$N$_2$CH(CH$_3$)$_2$CSi(CH$_3$)$_2$)$_3$CMgN(H)Ph],
129.13 [s, 2C, (C$_6$H$_4$N$_2$CH(CH$_3$)$_2$CSi(CH$_3$)$_2$)$_3$CMgN(H)Ph],
134.20 [s, 3C, (C$_6$H$_4$N$_2$CH(CH$_3$)$_2$CSi(CH$_3$)$_2$)$_3$CMgN(H)Ph],
144.19 [s, 3C, (C$_6$H$_4$N$_2$CH(CH$_3$)$_2$CSi(CH$_3$)$_2$)$_3$CMgN(H)Ph],
161.85 [s, 1C, (C$_6$H$_4$N$_2$CH(CH$_3$)$_2$CSi(CH$_3$)$_2$)$_3$CMgN(H)Ph],
167.09 [s, 3C, (C$_6$H$_4$N$_2$CH(CH$_3$)$_2$CSi(CH$_3$)$_2$)$_3$CMgN(H)Ph],
not observed [(C$_6$H$_4$N$_2$CH(CH$_3$)$_2$CSi(CH$_3$)$_2$)$_3$CMgN(H)Ph].
$^{29}$Si NMR (C$_6$D$_6$): −12.13 [s, 3Si, (C$_6$H$_4$N$_2$CH(CH$_3$)$_2$CSi(CH$_3$)$_2$)$_3$CMgN(H)Ph].
IR Data (ATR, cm$^{-1}$): 2917 (w), 2849 (w), 1603 (w), 1524 (m), 1499 (w), 1462 (m), 1397 (w), 1340 (w), 1266 (w), 1133 (w), 1061 (w), 1011 (w), 948 (w), 821 (s), 741 (vs), 692 (m), 505 (m), 431 (m).

Preparation of [Tism$^{Pr^jBenz}$]Mg(κ$^2$-O$_2$CMe)

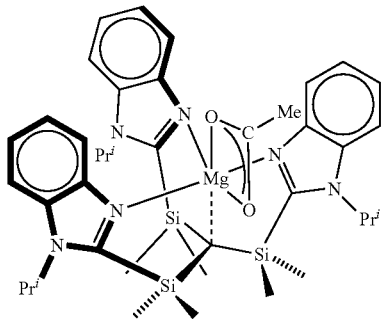

A solution of [Tism$^{Pr^jBenz}$]MgMe (30 mg, 0.043 mmol) in C$_6$D$_6$ (ca 0.7 mL) was treated with CO$_2$ (1 atm). The solution immediately turned cloudy. After one hour, the precipitate was collected and washed with benzene to afford [Tism$^{Pr^jBenz}$]Mg(κ$^2$-O$_2$CMe) as a white powder (22 mg, 69% yield). Colorless crystals suitable for X-ray diffraction were obtained via vapor diffusion of pentane into a concentrated solution of toluene.

Anal. calcd. for [Tism$^{Pr^jBenz}$]Mg(k$^2$-O$_2$CMe): C, 62.7%; H, 7.3%; N, 11.3%. Found: C, 63.2%; H, 6.6%; N, 10.5%.
$^1$H NMR (C$_6$D$_6$):
0.72 [s, 18H, (C$_6$H$_4$N$_2$CH(CH$_3$)$_2$CSi(CH$_3$)$_2$)$_3$CMgOC(O)CH$_3$],
1.08 [d, J=7 Hz, 18H, (C$_6$H$_4$N$_2$CH(CH$_3$)$_2$CSi(CH$_3$)$_2$)$_3$CMgOC(O)CH$_3$],
2.04 [s, 3H, (C$_6$H$_4$N$_2$CH(CH$_3$)$_2$CSi(CH$_3$)$_2$)$_3$CMgOC(O)CH$_3$],
4.68 [sep, J=7 Hz, 3H, (C$_6$H$_4$N$_2$CH(CH$_3$)$_2$CSi(CH$_3$)$_2$)$_3$CMgOC(O)CH$_3$],
6.94 [t, J=7 Hz, 3H, (C$_6$H$_4$N$_2$CH(CH$_3$)$_2$CSi(CH$_3$)$_2$)$_3$CMgOC(O)CH$_3$],
7.06 [d, J=8 Hz, 3H, (C$_6$H$_4$N$_2$CH(CH$_3$)$_2$CSi(CH$_3$)$_2$)$_3$CMgOC(O)CH$_3$],
7.22 [t, J=7 Hz, 3H, (C$_6$H$_4$N$_2$CH(CH$_3$)$_2$CSi(CH$_3$)$_2$)$_3$CMgOC(O)CH$_3$],
9.15 [d, J=8 Hz, 3H, (C$_6$H$_4$N$_2$CH(CH$_3$)$_2$CSi(CH$_3$)$_2$)$_3$CMgOC(O)CH$_3$].
$^{13}$C{$^1$H} NMR (C$_6$D$_6$):
6.95 [s, 6C, (C$_6$H$_4$N$_2$CH(CH$_3$)$_2$CSi(CH$_3$)$_2$)$_3$CMgOC(O)CH$_3$],
20.97 [s, 6C, (C$_6$H$_4$N$_2$CH(CH$_3$)$_2$CSi(CH$_3$)$_2$)$_3$CMgOC(O)CH$_3$],
23.42 [s, 1C, (C$_6$H$_4$N$_2$CH(CH$_3$)$_2$CSi(CH$_3$)$_2$)$_3$CMgOC(O)CH$_3$],
49.59 [s, 3C, (C$_6$H$_4$N$_2$CH(CH$_3$)$_2$CSi(CH$_3$)$_2$)$_3$CMgOC(O)CH$_3$],
112.47 [s, 3C, (C$_6$H$_4$N$_2$CH(CH$_3$)$_2$CSi(CH$_3$)$_2$)$_3$CMgOC(O)CH$_3$],
121.52 [s, 3C, (C$_6$H$_4$N$_2$CH(CH$_3$)$_2$CSi(CH$_3$)$_2$)$_3$CMgOC(O)CH$_3$],
122.34 [s, 3C, (C$_6$H$_4$N$_2$CH(CH$_3$)$_2$CSi(CH$_3$)$_2$)$_3$CMgOC(O)CH$_3$],
122.39 [s, 3C, (C$_6$H$_4$N$_2$CH(CH$_3$)$_2$CSi(CH$_3$)$_2$)$_3$CMgOC(O)CH$_3$],
134.15 [s, 3C, (C$_6$H$_4$N$_2$CH(CH$_3$)$_2$CSi(CH$_3$)$_2$)$_3$CMgOC(O)CH$_3$],
144.19 [s, 3C, (C$_6$H$_4$N$_2$CH(CH$_3$)$_2$CSi(CH$_3$)$_2$)$_3$CMgOC(O)CH$_3$],
165.91 [s, 3C, (C$_6$H$_4$N$_2$CH(CH$_3$)$_2$CSi(CH$_3$)$_2$)$_3$CMgOC(O)CH$_3$],
183.12 [s, 10, (C$_6$H$_4$N$_2$CH(CH$_3$)$_2$CSi(CH$_3$)$_2$)$_3$CMgOC(O)CH$_3$],
not observed [(C$_6$H$_4$N$_2$CH(CH$_3$)$_2$CSi(CH$_3$)$_2$)$_3$CMgOC(O)CH$_3$].
$^{29}$Si NMR (C$_6$D$_6$): −10.37 [s, 3Si, (C$_6$H$_4$N$_2$CH(CH$_3$)$_2$CSi(CH$_3$)$_2$)$_3$CMgOC(O)CH$_3$].
IR Data (ATR, cm$^{-1}$): 3056 (w), 3000 (w), 2974 (w), 2942 (w), 2896 (w), 1534 (m), 1464 (m), 1356 (m), 940 (s), 906 (s), 828 (m), 816 (m), 795 (m), 741 (s), 684 (m), 675 (m), 506 (m).

Preparation of [Tism$^{Pr^jBenz}$]Mg(κ$^2$-S$_2$CMe)

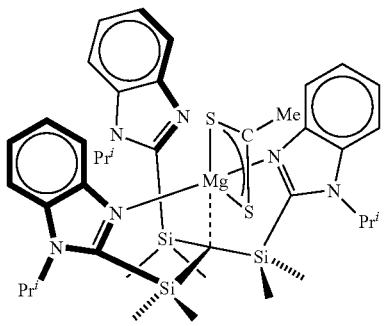

A solution of [Tism$^{Pr^jBenz}$]MgMe (30 mg, 0.043 mmol) in C$_6$D$_6$ (ca 0.7 mL) was treated with CS$_2$ (4 mg, 0.053 mmol). The solution immediately turned yellow. The solution was allowed to stand for a period of four days, after which time the precipitate was collected and washed with benzene to afford [Tism$^{Pr^jBenz}$]Mg(κ$^2$-S$_2$CMe) as a yellow powder (20 mg, 60% yield). Colorless crystals suitable for X-ray diffraction were obtained from a solution in benzene.
$^1$H NMR (C$_6$D$_6$):
0.58 [s, 18H, (C$_6$H$_4$N$_2$CH(CH$_3$)$_2$CSi(CH$_3$)$_2$)$_3$ CMgSC(S)CH$_3$],
1.16 [d, J=7 Hz, 18H, (C$_6$H$_4$N$_2$CH(CH$_3$)$_2$ CSi(CH$_3$)$_2$)$_3$CMgSC(S)CH$_3$], 2.89 [s, 3H, (C$_6$H$_4$N$_2$CH(CH$_3$)$_2$CSi(CH$_3$)$_2$)$_3$CMgSC(S)CH$_3$], 4.67 [sep, J=7 Hz, 3H, (C$_6$H$_4$N$_2$CH(CH$_3$)$_2$CSi(CH$_3$)$_2$)$_3$CMgSC(S)CH$_3$], 6.96 [t, J=7 Hz, 3H, (C$_6$H$_4$N$_2$CH(CH$_3$)$_2$CSi(CH$_3$)$_2$)$_3$CMgSC(S)CH$_3$], 7.13 [m, 6H, (C$_6$H$_4$N$_2$CH(CH$_3$)$_2$CSi(CH$_3$)$_2$)$_3$CMgSC(S)CH$_3$], 9.03 [d, J=8 Hz, 3H, (C$_6$H$_4$N$_2$CH(CH$_3$)$_2$CSi(CH$_3$)$_2$)$_3$CMgSC(S)CH$_3$].

$^1$H NMR (C$_7$D$_8$):

0.52 [s, 18H, (C$_6$H$_4$N$_2$CH(CH$_3$)$_2$CSi(CH$_3$)$_2$)$_3$CMgSC(S)CH$_3$], 1.21 [d, J=7 Hz, 18H, (C$_6$H$_4$N$_2$CH(CH$_3$)$_2$CSi(CH$_3$)$_2$)$_3$CMgSC(S)CH$_3$], 2.78 [s, 3H, (C$_6$H$_4$N$_2$CH(CH$_3$)$_2$CSi(CH$_3$)$_2$)$_3$CMgSC(S)CH$_3$], 4.68 [sep, J=7 Hz, 3H, (C$_6$H$_4$N$_2$CH(CH$_3$)$_2$CSi(CH$_3$)$_2$)$_3$CMgSC(S)CH$_3$], 6.95 [t, J=7 Hz, 3H, (C$_6$H$_4$N$_2$CH(CH$_3$)$_2$CSi(CH$_3$)$_2$)$_3$CMgSC(S)CH$_3$], 7.08 [m, 3H, (C$_6$H$_4$N$_2$CH(CH$_3$)$_2$CSi(CH$_3$)$_2$)$_3$CMgSC(S)CH$_3$], 7.12 [d, J=8 Hz, 3H, (C$_6$H$_4$N$_2$CH(CH$_3$)$_2$CSi(CH$_3$)$_2$)$_3$CMgSC(S)CH$_3$], 8.85 [d, J=8 Hz, 3H, (C$_6$H$_4$N$_2$CH(CH$_3$)$_2$CSi(CH$_3$)$_2$)$_3$CMgSC(S)CH$_3$].

$^{13}$C{$^1$H} NMR (C$_7$D$_8$):

5.77 [s, 6C, (C$_6$H$_4$N$_2$CH(CH$_3$)$_2$CSi(CH$_3$)$_2$)$_3$CMgSC(S)CH$_3$], 20.99 [s, 6C, (C$_6$H$_4$N$_2$CH(CH$_3$)$_2$CSi(CH$_3$)$_2$)$_3$CMgSC(S)CH$_3$], 45.75 [s, 1C, (C$_6$H$_4$N$_2$CH(CH$_3$)$_2$CSi(CH$_3$)$_2$)$_3$CMgSC(S)CH$_3$], 50.02 [s, 3C, (C$_6$H$_4$N$_2$CH(CH$_3$)$_2$CSi(CH$_3$)$_2$)$_3$CMgSC(S)CH$_3$], 112.24 [s, 3C, (C$_6$H$_4$N$_2$CH(CH$_3$)$_2$CSi(CH$_3$)$_2$)$_3$CMgSC(S)CH$_3$], 122.15 [s, 3C, (C$_6$H$_4$N$_2$CH(CH$_3$)$_2$CSi(CH$_3$)$_2$)$_3$CMgSC(S)CH$_3$], 122.37 [s, 3C, (C$_6$H$_4$N$_2$CH(CH$_3$)$_2$CSi(CH$_3$)$_2$)$_3$CMgSC(S)CH$_3$], 122.54 [s, 3C, (C$_6$H$_4$N$_2$CH(CH$_3$)$_2$CSi(CH$_3$)$_2$)$_3$CMgSC(S)CH$_3$], 134.29 [s, 3C, (C$_6$H$_4$N$_2$CH(CH$_3$)$_2$CSi(CH$_3$)$_2$)$_3$CMgSC(S)CH$_3$], 144.10 [s, 3C, (C$_6$H$_4$N$_2$CH(CH$_3$)$_2$CSi(CH$_3$)$_2$)$_3$CMgSC(S)CH$_3$], 166.63 [s, 3C, (C$_6$H$_4$N$_2$CH(CH$_3$)$_2$CSi(CH$_3$)$_2$)$_3$CMgSC(S)CH$_3$], not observed [s, 1C, (C$_6$H$_4$N$_2$CH(CH$_3$)$_2$CSi(CH$_3$)$_2$)$_3$CMgSC(S)CH$_3$], not observed [(C$_6$H$_4$N$_2$CH(CH$_3$)$_2$CSi(CH$_3$)$_2$)$_3$CMgSC(S)CH$_3$].

$^{29}$Si NMR (C$_7$D$_8$): −11.37 [s, 3Si, (C$_6$H$_4$N$_2$CH(CH$_3$)$_2$CSi(CH$_3$)$_2$)$_3$CMgSC(S)CH$_3$].

IR Data (ATR, cm$^{-1}$): 3051 (w), 2972 (w), 2939 (w), 2892 (w), 1462 (w), 1391 (w), 1372 (w), 1353 (w), 1151 (w), 1133 (w), 1065 (w), 926 (s), 891 (s), 846 (w), 826 (m), 812 (m), 793 (s), 760 (w), 737 (s), 695 (w), 679 (w), 502 (w), 488 (w), 439 (w).

Preparation of [Tism$^{Pr^iBenz}$]MgH

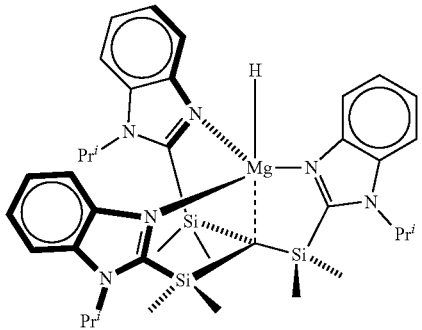

A solution of PhSiH$_3$ (9 μL, 0.073 mmol) in C$_6$D$_6$ (ca 0.7 mL) was added to [Tism$^{Pr^iBenz}$]MgMe (30 mg, 0.043 mmol) in an NMR tube equipped with a J. Young tube. The solution was allowed to stand at room temperature for 16 hours and then filtered. The filtrate was lyophilized to afford [Tism$^{Pr^iBenz}$]MgH as an off-white powder (20 mg, 68% yield). Colorless crystals suitable for X-ray diffraction were obtained directly from the benzene filtrate of the reaction mixture.

$^1$H NMR (C$_6$D$_6$):

0.43 [s, 18H, (C$_6$H$_4$N$_2$CH(CH$_3$)$_2$CSi(CH$_3$)$_2$)$_3$CMgH], 1.18 [d, J=7 Hz, 18H, (C$_6$H$_4$N$_2$CH(CH$_3$)$_2$ CSi(CH$_3$)$_2$)$_3$CMgH], 4.68 [sep, J=7 Hz, 3H, (C$_6$H$_4$N$_2$CH(CH$_3$)$_2$ CSi(CH$_3$)$_2$)$_3$CMgH], 6.78 [s, 1H, (C$_6$H$_4$N$_2$CH(CH$_3$)$_2$CSi(CH$_3$)$_2$)$_3$CMgH], 7.03 [t, J=7 Hz, 3H, (C$_6$H$_4$N$_2$CH(CH$_3$)$_2$ CSi(CH$_3$)$_2$)$_3$CMgH], 7.18 [m, 6H, (C$_6$H$_4$N$_2$CH(CH$_3$)$_2$CSi(CH$_3$)$_2$)$_3$CMgH], 9.89 [d, J=8 Hz, 3H, (C$_6$H$_4$N$_2$CH(CH$_3$)$_2$ CSi(CH$_3$)$_2$)$_3$CMgH].

$^{13}$C{$^1$H} NMR (C$_6$D$_6$):

4.80 [s, 6C, (C$_6$H$_4$N$_2$CH(CH$_3$)$_2$CSi(CH$_3$)$_2$)$_3$CMgH], 21.11 [s, 6C, (C$_6$H$_4$N$_2$CH(CH$_3$)$_2$CSi(CH$_3$)$_2$)$_3$CMgH], 50.04 [s, 3C, (C$_6$H$_4$N$_2$CH(CH$_3$)$_2$CSi(CH$_3$)$_2$)$_3$CMgH], 112.03 [s, 3C, (C$_6$H$_4$N$_2$CH(CH$_3$)$_2$CSi(CH$_3$)$_2$)$_3$CMgH], 122.49 [s, 3C, (C$_6$H$_4$N$_2$CH(CH$_3$)$_2$CSi(CH$_3$)$_2$)$_3$CMgH], 122.76 [s, 3C, (C$_6$H$_4$N$_2$CH(CH$_3$)$_2$CSi(CH$_3$)$_2$)$_3$CMgH], 123.52 [s, 30, (C$_6$H$_4$N$_2$CH(CH$_3$)$_2$CSi(CH$_3$)$_2$)$_3$CMgH], 134.31 [s, 3C, (C$_6$H$_4$N$_2$CH(CH$_3$)$_2$CSi(CH$_3$)$_2$)$_3$CMgH], 145.22 [s, 3C, (C$_6$H$_4$N$_2$CH(CH$_3$)$_2$CSi(CH$_3$)$_2$)$_3$CMgH], 167.17 [s, 3C, (C$_6$H$_4$N$_2$CH(CH$_3$)$_2$CSi(CH$_3$)$_2$)$_3$CMgH], not observed [(C$_6$H$_4$N$_2$CH(CH$_3$)$_2$CSi(CH$_3$)$_2$)$_3$CMgH].

$^{29}$Si NMR (C$_6$D$_6$): −12.49 [s, 3Si, (C$_6$H$_4$N$_2$CH(CH$_3$)$_2$CSi(CH$_3$)$_2$)$_3$CMgH].

IR Data (FT-IR, cm$^{-1}$): 3057 (w), 2974 (m), 2941 (m), 2894 (w), 1465 (m), 1391 (w), 1371 (w), 1356 (m), 1323 (w), 1302 (w), 1282 (w), 1252 (m), 1066 (m) 1012 (w), 949 (s), 827 (s), 790 (m), 746 (s).

Preparation of [Tism$^{Pr^iBenz}$]MgCH(Me)Ph

Three preparation methods were employed:

(i) A solution of [Tism$^{Pr^iBenz}$]MgMe (30 mg, 0.043 mmol) in $C_6D_6$ (ca. 0.7 mL) was treated with PhSiH$_3$ and styrene (ca 1.5 equivalents each). The mixture was allowed to stand at room temperature for 16 hours, after which period, the mixture was lyophilized to afford a yellow powder. The solid obtained was washed with benzene (1×1 mL) and pentane (1×1 mL) to afford [Tism$^{Pr^iBenz}$]MgCH(Me)Ph (17 mg, 50%) as an off-white powder. Colorless crystals suitable for X-ray diffraction were formed by slowly cooling a saturated solution from 60° C. to room temperature.

(ii) A solution of [Tism$^{Pr^iBenz}$]MgH (10 mg, 0.015 mmol) in benzene (ca 0.7 mL) was treated with styrene (2 mg, 0.019 mmol), and stirred for 2 hours at room temperature. After this period, the mixture was lyophilized and the solid was washed with benzene to afford [Tism$^{Pr^iBenz}$]MgCH(Me)Ph as a white powder.

(iii) A solution of [Tism$^{Pr^iBenz}$]MgH (2 mg, 0.003 mmol) in $C_6D_6$ (Ca 0.7 mL) was treated with styrene (10 equivalents, 0.029 mmol). The reaction was monitored by $^1$H NMR spectroscopy, thereby demonstrating complete consumption of [Tism$^{Pr^iBenz}$]MgH after 10 minutes at room temperature.

$^1$H NMR ($C_6D_6$):

0.56 [s, 9H, $(C_6H_4N_2CH(CH_3)_2CSi(C\underline{H}_3)_2)_3$ CMgCH(Me)Ph], 0.59 [s, 9H, $(C_6H_4N_2CH(C\underline{H}_3)_2CSi(C\underline{H}_3)_2)_3$ CMgCH(Me)Ph], 1.04 [d, J=7 Hz, 9H, $(C_6H_4N_2CH(C\underline{H}_3)_2CSi(CH_3)_2)_3$ CMgCH(Me)Ph], 1.09 [d, J=7 Hz, 9H, $(C_6H_4N_2CH(C\underline{H}_3)_2CSi(CH_3)_2)_3$ CMgCH(Me)Ph], 2.03 [d, J=7 Hz, 3H, $(C_6H_4N_2CH(CH_3)_2CSi(CH_3)_2)_3$ CMgCH(\underline{Me})Ph], 2.64 [q, J=7 Hz, 1H, $(C_6H_4N_2CH(CH_3)_2CSi(CH_3)_2)_3$ CMgC\underline{H}(Me)Ph], 4.58 [sep, J=7 Hz, 3H, $(C_6H_4N_2C\underline{H}(CH_3)_2 CSi(CH_3)_2)_3$ CMgCH(Me)Ph], 6.91 [t, 8 Hz, 1H, $(C_6H_4N_2CH(CH_3)_2CSi(CH_3)_2)_3CMg$ CH(Me)\underline{Ph}], 6.92 [t, 8 Hz, 3H, $(C_6\underline{H}_4N_2CH(CH_3)_2 CSi(CH_3)_2)_3$ CMgCH(Me)Ph], 7.06 [d, 9 Hz, 3H, $(C_6\underline{H}_4N_2CH(CH_3)_2 CSi(CH_3)_2)_3$ CMgCH(Me)Ph], 7.11 [t, 8 Hz, 3H, $(C_6\underline{H}_4N_2CH(CH_3)_2 CSi(CH_3)_2)_3$ CMgCH(Me)Ph], 7.13 [d, 8 Hz, 2H, $(C_6H_4N_2CH(CH_3)_2CSi(CH_3)_2)_3$ CMgCH(Me)\underline{Ph}], 7.30 [t, 8 Hz, 2H, $(C_6H_4N_2CH(CH_3)_2CSi(CH_3)_2)_3$ CMgCH(Me)\underline{Ph}].

7.87 [d, J=8 Hz, 3H, $(C_6\underline{H}_4N_2 CH(CH_3)_2CSi(CH_3)_2)_3$ CMgCH(Me)Ph].

$^{13}$C{$^1$H} NMR ($C_6D_6$):

6.52 [s, 3C, $(C_6H_4N_2CH(CH_3)_2CSi(CH_3)_2)_3CMgCH(Me)Ph$], 6.76 [s, 3C, $(C_6H_4N_2CH(CH_3)_2CSi(CH_3)_2)_3CMgCH(Me)Ph$], 19.84 [s, 10, $(C_6H_4N_2CH(CH_3)_2CSi(CH_3)_2)_3CMgCH(\underline{Me})Ph$], 20.89 [s, 3C, $(C_6H_4N_2CH(CH_3)_2CSi(CH_3)_2)_3CMgCH(Me)Ph$], 21.07 [s, 3C, $(C_{61-14}N_2CH(CH_3)_2CSi(CH_3)_2)_3CMgCH(Me)Ph$], 33.87 [s, 10, $(C_6H_4N_2CH(CH_3)_2CSi(CH_3)_2)_3CMgCH(Me)Ph$], 49.65 [s, 3C, $(C_6H_4N_2CH(CH_3)_2CSi(CH_3)_2)_3CMgCH(Me)Ph$], 112.46 [s, 3C, $(C_{61-14}N_2CH(CH_3)_2CSi(CH_3)_2)_3CMgCH(Me)Ph$], 115.51 [s, 10, $(C_6F14N_2CH(CH_3)_2CSi(CH_3)_2)_3CMgCH(Me)\underline{Ph}$], 120.98 [s, 3C, $(C_6H_4N_2CH(CH_3)_2CSi(CH_3)_2)_3CMgCH(Me)Ph$], 122.30 [s, 3C, $(C_6H_4N_2CH(CH_3)_2CSi(CH_3)_2)_3CMgCH(Me)Ph$], 122.58 [s, 3C, $(C_{61-14}N_2CH(CH_3)_2CSi(CH_3)_2)_3CMgCH(Me)Ph$], 123.16 [s, 2C, $(C_6H_4N_2CH(CH_3)_2CSi(CH_3)_2)_3CMgCH(Me)\underline{Ph}$], 133.78 [s, 30, $(C_{61-14}N_2CH(CH_3)_2CSi(CH_3)_2)_3CMgCH(Me)Ph$], 143.73 [s, 3C, $(C_6H_4N_2CH(CH_3)_2CSi(CH_3)_2)_3CMgCH(Me)Ph$], 162.35 [s, 10, $(C_6H_4N_2CH(CH_3)_2CSi(CH_3)_2)_3CMgCH(Me)\underline{Ph}$], 165.12 [s, 3C, $(C_6H_4N_2CH(CH_3)_2CSi(CH_3)_2)_3CMgCH(Me)Ph$], not observed $[(C_{61-14}N_2CH(CH_3)_2CSI(CH_3)_2)_3CMgCH(Me)Ph]$, 2C obscured by solvent $[(C_6H_4N_2CH(CH_3)_2CSi(CH_3)_2)_3CMgCH(Me)\underline{Ph}]$.

$^{29}$Si NMR ($C_6D_6$): −10.31 [s, 3Si, $(C_6H_4N_2CH(CH_3)_2C\underline{Si}(CH_3)_2)_3CMgCH(Me)Ph$].

IR Data (ATR, cm$^{-1}$): 2973 (w), 1605 (w), 1460 (m), 1392 (w), 1370 (w), 1339 (m), 1323 (w), 1266 (w), 1158 (w), 1132 (w), 1104 (w), 1060 (m), 1010 (w), 948 (w), 820 (vs), 779 (s), 739 (vs), 696 (m), 649 (m), 540 (m), 499 (m), 430 (m).

Preparation of [κ³-Tism$^{Pr^jBenz}$]ZnBr

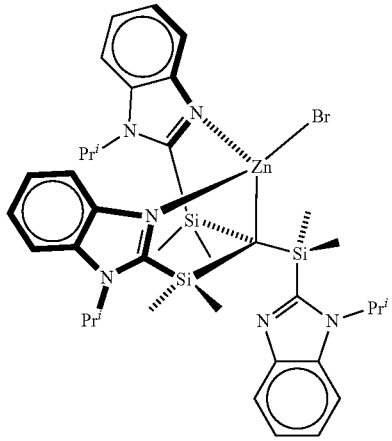

A mixture of ZnBr$_2$ (115 mg, 0.511 mmol) and [Tism$^{Pr^jBenz}$]Li (300 mg, 0.447 mmol) in THF (ca 5 mL) was stirred for 30 minutes at room temperature. After this period, the volatile components were removed in vacuo resulting in the formation of a sticky solid, which was treated with pentane (ca 5 mL). The mixture was stirred for 10 minutes and the volatile components were removed in vacuo to afford an off-white powder. The solid was extracted into benzene (ca 10 mL) and lyophilized to afford [κ³-Tism$^{Pr^jBenz}$]ZnBr (250 mg, 69%) as a white powder. Colorless crystals suitable for X-ray diffraction were obtained by the vapor diffusion of pentane into a concentrated solution in benzene.

Anal. calcd. for [k³-Tism$^{Pr^jBenz}$]ZnBr.0.5C$_6$H$_6$: C, 56.6%; H, 6.4%; N, 9.9%. Found: C, 56.5%; H, 6.2%; N, 9.2%.

$^1$H NMR (C$_6$D$_6$):
0.77 [s, 18H, (C$_6$H$_4$N$_2$CH(CH$_3$)$_2$CSi(CH$_3$)$_2$)$_3$CZnBr],
1.12 [d, J=7 Hz, 18H, (C$_6$H$_4$N$_2$CH(CH$_3$)$_2$ CSi(CH$_3$)$_2$)$_3$CZnBr],
4.65 [sep, J=7 Hz, 3H, (C$_6$H$_4$N$_2$CH(CH$_3$)$_2$ CSi(CH$_3$)$_2$)$_3$CZnBr],
7.04 [m, 3H, (C$_6$H$_4$N$_2$CH(CH$_3$)$_2$CSi(CH$_3$)$_2$)$_3$CZnBr],
7.17 [m, 6H, (C$_6$H$_4$N$_2$CH(CH$_3$)$_2$CSi(CH$_3$)$_2$)$_3$CZnBr],
8.55 [d, J=8 Hz, 3H, (C$_6$H$_4$N$_2$CH (CH$_3$)$_2$CSi(CH$_3$)$_2$)$_3$CZnBr].

$^{13}$C{$^1$H} NMR (C$_6$D$_6$):
4.72 [s, 6C, (C$_6$H$_4$N$_2$CH(CH$_3$)$_2$CSi(CH$_3$)$_2$)$_3$CZnBr],
21.09 [s, 6C, (C$_6$H$_4$N$_2$CH(CH$_3$)$_2$CSi(CH$_3$)$_2$)$_3$CZnBr],
50.29 [s, 3C, (C$_6$H$_4$N$_2$CH(CH$_3$)$_2$CSi(CH$_3$)$_2$)$_3$CZnBr],
112.94 [s, 3C, (C$_6$H$_4$N$_2$CH(CH$_3$)$_2$CSi(CH$_3$)$_2$)$_3$CZnBr],
120.21 [s, 3C, (C$_6$H$_4$N$_2$CH(CH$_3$)$_2$CSi(CH$_3$)$_2$)$_3$CZnBr],
122.82 [s, 3C, (C$_6$H$_4$N$_2$CH(CH$_3$)$_2$CSi(CH$_3$)$_2$)$_3$CZnBr],
122.94 [s, 3C, (C$_6$H$_4$N$_2$CH(CH$_3$)$_2$CSi(CH$_3$)$_2$)$_3$CZnBr],
134.58 [s, 3C, (C$_6$H$_4$N$_2$CH(CH$_3$)$_2$CSi(CH$_3$)$_2$)$_3$CZnBr],
143.88 [s, 3C, (C$_6$H$_4$N$_2$CH(CH$_3$)$_2$CSi(CH$_3$)$_2$)$_3$CZnBr],
165.99 [s, 3C, (C$_6$H$_4$N$_2$CH(CH$_3$)$_2$CSi(CH$_3$)$_2$)$_3$CZnBr],
not observed [(C$_6$H$_4$N$_2$CH(CH$_3$)$_2$CSi(CH$_3$)$_2$)$_3$CZnBr].

$^{29}$Si NMR (C$_6$D$_6$): −6.75 [s, 3Si, (C$_6$H$_4$N$_2$CH(CH$_3$)$_2$C Si(CH$_3$)$_2$)$_3$CZnBr].

IR Data (ATR, cm$^{-1}$): 2974 (w), 1463 (w), 1390 (w), 1367 (w), 1323 (w), 1293 (w), 1255 (w), 1068 (w), 881 (s), 830 (s), 814 (s), 798 (m), 766 (w), 740 (s), 695 (w), 652 (w), 564 (w).

Preparation of [κ³-Tism$^{Pr^jBenz}$]ZnH

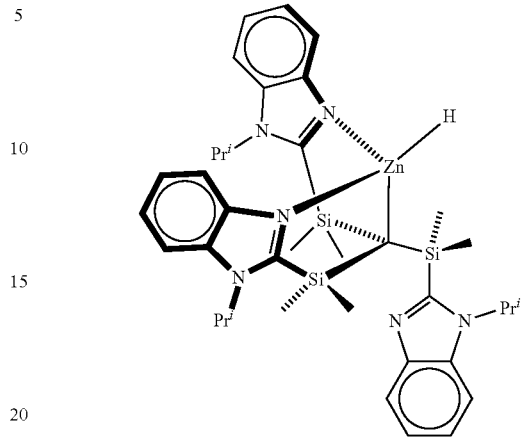

A mixture of [Tism$^{Pr^jBenz}$]Li (300 mg, 0.447 mmol) and ZnBr$_2$ (111 mg, 0.493 mmol) in THF (ca 10 mL) was stirred for 30 minutes at room temperature. After this period, the volatile components were removed in vacuo, resulting in the formation of a sticky solid, which was extracted into benzene (ca 10 mL) and then treated with KOSiMe$_3$ (90%, 116 mg, 0.81 mmol). The mixture was stirred for 10 minutes and a white precipitate was deposited. The mixture was filtered and the filtrate was treated with PhSiH$_3$ (150 mg, 1.386 mmol) and the mixture was stirred for 5 minutes. After this period, the volatile components were removed by lyophilization and the resulting light yellow solid was washed with diethyl ether (1×2 mL). Colorless crystals of [κ³-Tism$^{Pr^jBenz}$]ZnH (110 mg, 34%) suitable for X-ray diffraction were obtained from a solution in benzene.

Anal. calcd. for [k³-Tism$^{Pr^jBenz}$]ZnH: C, 60.8%; H, 7.2%; N, 11.5%. Found: C, 61.3%; H, 7.0%; N, 11.1%.

$^1$H NMR (C$_6$D$_6$):
0.81 [s, 18H, (C$_6$H$_4$N$_2$CH(CH$_3$)$_2$CSi(CH$_3$)$_2$)$_3$CZnH],
1.14 [d, J=7 Hz, 18H, (C$_6$H$_4$N$_2$CH(CH$_3$)$_2$ CSi(CH$_3$)$_2$)$_3$CZnH],
4.72 [sep, J=7 Hz, 3H, (C$_6$H$_4$N$_2$CH(CH$_3$)$_2$ CSi(CH$_3$)$_2$)$_3$CZnH],
5.53 [s, 1H, (C$_6$H$_4$N$_2$CH(CH$_3$)$_2$CSi(CH$_3$)$_2$)$_3$CZnH],
7.05 [m, 3H, (C$_6$H$_4$N$_2$CH(CH$_3$)$_2$CSi(CH$_3$)$_2$)$_3$CZnH],
7.15 [m, 3H, (C$_6$H$_4$N$_2$CH(CH$_3$)$_2$CSi(CH$_3$)$_2$)$_3$CZnH],
7.23 [d, J=9 Hz, 3H, (C$_6$H$_4$N$_2$ CH(CH$_3$)$_2$CSi(CH$_3$)$_2$)$_3$CZnH],
8.24 [d, J=8 Hz, 3H, (C$_6$H$_4$N$_2$ CH(CH$_3$)$_2$CSi(CH$_3$)$_2$)$_3$CZnH].

$^{13}$C{$^1$H} NMR (C$_6$D$_6$):
5.03 [s, 6C, (C$_6$H$_4$N$_2$CH(CH$_3$)$_2$CSi(CH$_3$)$_2$)$_3$CZnH],
21.17 [s, 6C, (C$_6$H$_4$N$_2$CH(CH$_3$)$_2$CSi(CH$_3$)$_2$)$_3$CZnH],
50.04 [s, 3C, (C$_6$H$_4$N$_2$CH(CH$_3$)$_2$CSi(CH$_3$)$_2$)$_3$CZnH],
112.88 [s, 3C, (C$_6$H$_4$N$_2$CH(CH$_3$)$_2$CSi(CH$_3$)$_2$)$_3$CZnH],
119.96 [s, 3C, (C$_6$H$_4$N$_2$CH(CH$_3$)$_2$CSi(CH$_3$)$_2$)$_3$CZnH],
122.41 [s, 3C, (C$_6$H$_4$N$_2$CH(CH$_3$)$_2$CSi(CH$_3$)$_2$)$_3$CZnH],
122.54 [s, 3C, (C$_6$H$_4$N$_2$CH(CH$_3$)$_2$CSi(CH$_3$)$_2$)$_3$CZnH],
134.58 [s, 3C, (C$_6$H$_4$N$_2$CH(CH$_3$)$_2$CSi(CH$_3$)$_2$)$_3$CZnH],
144.53 [s, 3C, (C$_6$H$_4$N$_2$CH(CH$_3$)$_2$CSi(CH$_3$)$_2$)$_3$CZnH],
166.62 [s, 3C, (C$_6$H$_4$N$_2$CH(CH$_3$)$_2$CSi(CH$_3$)$_2$)$_3$CZnH],
not observed [(C$_6$H$_4$N$_2$CH(CH$_3$)$_2$CSi(CH$_3$)$_2$)$_3$CZnH].

$^{29}$Si NMR (C$_6$D$_6$): −7.70 [s, 3Si, (C$_6$H$_4$N$_2$CH(CH$_3$)$_2$C Si(CH$_3$)$_2$)$_3$CZnH].

IR Data (ATR, cm$^{-1}$): 2972 (w), 1681 (w), 1463 (w), 1390 (w), 1356 (w), 1330 (w), 1290 (w), 1250 (w), 1160 (w), 1132 (w), 1066 (w), 918 (m), 889 (s), 828 (s), 813 (s), 798 (s), 765 (m), 737 (vs), 684 (w), 647 (w), 561 (w), 498 (s), 465 (m), 429 (w).

Preparation of {[Tism$^{Pr^iBenz}$]Zn}[HB(C$_6$F$_5$)$_3$]

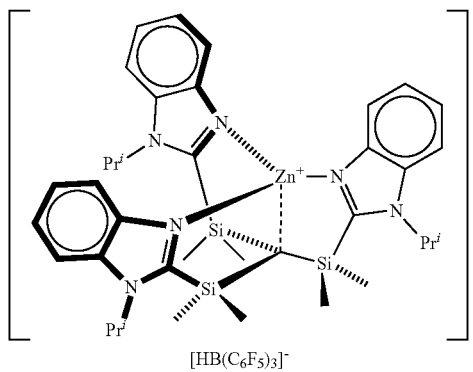

A solution of [κ$^3$-Tism$^{Pr^iBenz}$]ZnH (7.5 mg, 0.010 mmol) in benzene (ca 0.5 mL) was added dropwise to a solution of B(C$_6$F$_5$)$_3$ (6 mg, 0.012 mmol) in benzene (ca 0.5 mL). The solution was allowed to stand for 30 minutes, during which period, crystals suitable for X-ray diffraction were deposited. The colorless crystals of {[Tism$^{Pr^iBenz}$]Zn}[HB(C$_6$F$_5$)$_3$] were collected and washed with benzene (1 mL) and pentane (1 mL), and dried in vacuo (6 mg, 47%).

$^1$H NMR (C$_6$D$_6$):
0.27 [s, 18H, (C$_6$H$_4$N$_2$CH(CH$_3$)$_2$CSi(C$\underline{H}_3$)$_2$)$_3$ CZnHB(C$_6$F$_5$)$_3$],
1.12 [d, J=7 Hz, 18H, (C$_6$H$_4$N$_2$CH(C$\underline{H}_3$)$_2$CSi(CH$_3$)$_2$)$_3$ CZnHB(C$_6$F$_5$)$_3$],
4.46 [sep, J=7 Hz, 3H, (C$_6$H$_4$N$_2$C$\underline{H}$(CH$_3$)$_2$CSi(CH$_3$)$_2$)$_3$ CZnHB(C$_6$F$_5$)$_3$],
6.97 [m, J=7 Hz, 3H, (C$_6$$\underline{H}_4$N$_2$CH(CH$_3$)$_2$CSi(CH$_3$)$_2$)$_3$ CZnHB(C$_6$F$_5$)$_3$],
7.10 [m, 6H, (C$_6$$\underline{H}_4$N$_2$CH(CH$_3$)$_2$CSi(CH$_3$)$_2$)$_3$ CZnHB(C$_6$F$_5$)$_3$],
7.78 [d, J=8 Hz, 3H, (C$_6$$\underline{H}_4$N$_2$CH(CH$_3$)$_2$CSi(CH$_3$)$_2$)$_3$ CZnHB(C$_6$F$_5$)$_3$],
not observed [1H, (C$_6$H$_4$N$_2$CH(CH$_3$)$_2$CSi(CH$_3$)$_2$)$_3$CZn$\underline{H}$B(C$_6$F$_5$)$_3$].

$^1$H NMR (C$_6$D$_5$Br):
0.29 [s, 18H, (C$_6$H$_4$N$_2$CH(CH$_3$)$_2$CSi(C$\underline{H}_3$)$_2$)$_3$ CZnHB(C$_6$F$_5$)$_3$],
1.35 [d, J=7 Hz, 18H, (C$_6$H$_4$N$_2$CH(C$\underline{H}_3$)$_2$ CSi(CH$_3$)$_2$)$_3$ CZnHB(C$_6$F$_5$)$_3$),
4.58 [sep, J=7 Hz, 3H, (C$_6$H$_4$N$_2$C$\underline{H}$(CH$_3$)$_2$ CSi(CH$_3$)$_2$)$_3$ CZnHB(C$_6$F$_5$)$_3$],
7.15 [t, J=7 Hz, 3H, (C$_6$$\underline{H}_4$N$_2$ CH(CH$_3$)$_2$CSi(CH$_3$)$_2$)$_3$ CZnHB(C$_6$F$_5$)$_3$],
7.23 [m, 3H, (C$_6$$\underline{H}_4$N$_2$CH(CH$_3$)$_2$CSi(CH$_3$)$_2$)$_3$ CZnHB(C$_6$F$_5$)$_3$],
7.36 [d, J=8 Hz, 3H, (C$_6$$\underline{H}_4$N$_2$CH(CH$_3$)$_2$CSi(CH$_3$)$_2$)$_3$ CZnHB(C$_6$F$_5$)$_3$],
7.90 [d, J=8 Hz, 3H, (C$_6$$\underline{H}_4$N$_2$CH(CH$_3$)$_2$CSi(CH$_3$)$_2$)$_3$ CZnHB(C$_6$F$_5$)$_3$],
not observed [1H, (C$_6$H$_4$N$_2$CH(CH$_3$)$_2$CSi(CH$_3$)$_2$)$_3$CZn$\underline{H}$B(C$_6$F$_5$)$_3$].

$^{13}$C{$^1$H} NMR (C$_6$D$_5$Br):
3.38 [s, 6C, (C$_6$H$_4$N$_2$CH(CH$_3$)$_2$CSi(CH$_3$)$_2$)$_3$CZnHB(C$_6$F$_5$)$_3$],
20.92 [s, 6C, (C$_6$H$_4$N$_2$CH(CH$_3$)$_2$CSi(CH$_3$)$_2$)$_3$CZnHB(C$_6$F$_5$)$_3$],
51.25 [s, 3C, (C$_6$H$_4$N$_2$CH(CH$_3$)$_2$CSi(CH$_3$)$_2$)$_3$CZnHB(C$_6$F$_5$)$_3$],
113.77 [s, 3C, (C$_6$H$_4$N$_2$CH(CH$_3$)$_2$CSi(CH$_3$)$_2$)$_3$CZnHB(C$_6$F$_5$)$_3$],
116.87 [s, 3C, (C$_6$H$_4$N$_2$CH(CH$_3$)$_2$CSi(CH$_3$)$_2$)$_3$CZnHB(C$_6$F$_5$)$_3$],
124.24 [s, 3C, (C$_6$H$_4$N$_2$CH(CH$_3$)$_2$CSi(CH$_3$)$_2$)$_3$CZnHB(C$_6$F$_5$)$_3$],
124.41 [s, 3C, (C$_6$H$_4$N$_2$CH(CH$_3$)$_2$CSi(CH$_3$)$_2$)$_3$CZnHB(C$_6$F$_5$)$_3$],
133.44 [s, 3C, (C$_6$H$_4$N$_2$CH(CH$_3$)$_2$CSi(CH$_3$)$_2$)$_3$CZnHB(C$_6$F$_5$)$_3$],
140.48 [s, 3C, (C$_6$H$_4$N$_2$CH(CH$_3$)$_2$CSi(CH$_3$)$_2$)$_3$CZnHB(C$_6$F$_5$)$_3$],
167.09 [s, 3C, (C$_6$H$_4$N$_2$CH(CH$_3$)$_2$CSi(CH$_3$)$_2$)$_3$CZnHB(C$_6$F$_5$)$_3$],
not observed/obscured by solvent [(C$_6$H$_4$N$_2$CH(CH$_3$)$_2$CSi(CH$_3$)$_2$)$_3$CZnHB(C$_6$F$_5$)$_3$].

$^{19}$F NMR (C$_6$D$_5$Br):
−166.22 [meta, m, 6F, (C$_6$H$_4$N$_2$CH(CH$_3$)$_2$)$_3$CZnHB(C$_6$$\underline{F}_5$)$_3$],
−163.59 [para, t, J=21 Hz, 3F, (C$_6$H$_4$N$_2$CH(CH$_3$)$_2$CSi(CH$_3$)$_2$)$_3$CZnHB(C$_6$$\underline{F}_5$)$_3$],
−131.84 [ortho, d, J=22 Hz, 6F, (C$_6$H$_4$N$_2$CH(CH$_3$)$_2$CSi(CH$_3$)$_2$)$_3$CZnHB(C$_6$$\underline{F}_5$)$_3$].

$^{29}$Si NMR (C$_6$D$_5$Br): −4.48 [s, 3Si, (C$_6$H$_4$N$_2$CH(CH$_3$)$_2$C$\underline{Si}$(CH$_3$)$_2$)$_3$CZnHB(C$_6$F$_5$)$_3$].

$^{11}$B NMR (C$_6$D$_5$Br):
−24.5 [d, J=95 Hz, 1B, (C6H4N2CH(CH3)2CSi(CH3)2)3CZnHB(C6F5)3].

IR Data (ATR, cm$^{-1}$): 2975 (w), 1639 (w), 1508 (m), 1460 (s), 1403 (w), 1371 (m), 1317 (w), 1298 (w), 1274 (w), 1260 (w), 1163 (m), 1102 (m), 1068 (m), 968 (s), 922 (vs), 827 (s), 813 (m), 790 (m), 764 (m), 745 (s), 700 (w), 678 (vs), 659 (m), 601 (w), 564 (m), 530 (w), 467 (w), 444 (w), 434 (w), 405 (w).

Preparation of [Tism$^{Pr^iBenz}$]Mg(κ$^2$-O$_2$CH)

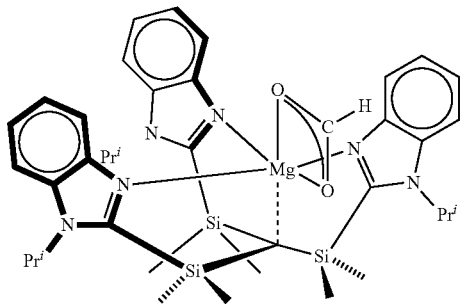

A solution of [Tism$^{Pr^iBenz}$]MgH (20 mg, 0.029 mmol) in C$_6$D$_6$ (Ca 0.7 mL) was treated with CO$_2$ (1 atm), resulting in an immediate color change from yellow to colorless and the deposition of a white precipitate over a period of 10 minutes. The precipitate was collected and washed with benzene (3×1 mL) to give [Tism$^{Pr^iBenz}$]Mg(κ$^2$—O$_2$CH) as a white powder (10 mg, 47% yield). Colorless crystals suitable for X-ray diffraction were obtained via slow evaporation from a concentrated benzene solution.

Anal. calcd. for [Tism$^{Pr^jBenz}$]Mg(k$^2$-O$_2$CH).C$_6$H$_6$: C, 65.1%; H, 7.2%; N, 10.4%. Found: C, 64.4%; H, 6.9%; N, 9.9%.

$^1$H NMR (C$_6$D$_6$):

0.68 [s, 18H, (C$_6$H$_4$N$_2$CH(CH$_3$)$_2$CSi(C$\underline{H}_3$)$_2$)$_3$ CMgOC(O)H], 1.10 [d, J=7 Hz, 18H, (C$_6$H$_4$N$_2$CH(C$\underline{H}_3$)$_2$ CSi(CH$_3$)$_2$)$_3$ CMgOC(O)H], 4.68 [sep, J=7 Hz, 3H, (C$_6$H$_4$N$_2$C$\underline{H}$(CH$_3$)$_2$ CSi(CH$_3$)$_2$)$_3$ CMgOC(O)H], 6.94 [t, J=8 Hz, 3H, (C$_6\underline{H}_4$N$_2$CH(CH$_3$)$_2$ CSi(CH$_3$)$_2$)$_3$ CMgOC(O)H], 7.08 [d, J=8 Hz, 3H, (C$_6\underline{H}_4$N$_2$CH(CH$_3$)$_2$CSi(CH$_3$)$_2$)$_3$ CMgOC(O)H], 7.19 [t, J=8 Hz, 3H, (C$_6\underline{H}_4$N$_2$CH(CH$_3$)$_2$CSi(CH$_3$)$_2$)$_3$ CMgOC(O)H], 8.87 [s, 1H, (C$_6$H$_4$N$_2$CH(CH$_3$)$_2$CSi(CH$_3$)$_2$)$_3$CMgOC(O)$\underline{H}$], 9.06 [d, J=8 Hz, 3H, (C$_6\underline{H}_4$N$_2$CH(CH$_3$)$_2$CSi(CH$_3$)$_2$)$_3$ CMgOC(O)H].

$^{13}$C{$^1$H} NMR (C$_6$D$_6$):

6.69 [s, 6C, (C$_6$H$_4$N$_2$CH(CH$_3$)$_2$CSi(CH$_3$)$_2$)$_3$CMgOC(O)H], 21.00 [s, 6C, (C$_6$H$_4$N$_2$CH(CH$_3$)$_2$CSi(CH$_3$)$_2$)$_3$CMgOC(O)H], 49.69 [s, 3C, (C$_6$H$_4$N$_2$CH(CH$_3$)$_2$CSi(CH$_3$)$_2$)$_3$CMgOC(O)H], 112.45 [s, 3C, (C$_6$H$_4$N$_2$CH(CH$_3$)$_2$CSi(CH$_3$)$_2$)$_3$CMgOC(O)H], 121.55 [s, 3C, (C$_6$H$_4$N$_2$CH(CH$_3$)$_2$CSi(CH$_3$)$_2$)$_3$CMgOC(O)H], 122.46 [s, 3C, (C$_6$H$_4$N$_2$CH(CH$_3$)$_2$CSi(CH$_3$)$_2$)$_3$CMgOC(O)H], 122.52 [s, 3C, (C$_6$H$_4$N$_2$CH(CH$_3$)$_2$CSi(CH$_3$)$_2$)$_3$CMgOC(O)H], 134.13 [s, 3C, (C$_6$H$_4$N$_2$CH(CH$_3$)$_2$CSi(CH$_3$)$_2$)$_3$CMgOC(O)H], 144.02 [s, 3C, (C$_6$H$_4$N$_2$CH(CH$_3$)$_2$CSi(CH$_3$)$_2$)$_3$CMgOC(O)H], 166.06 [s, 3C, (C$_6$H$_4$N$_2$CH(CH$_3$)$_2$CSi(CH$_3$)$_2$)$_3$CMgOC(O)$_H$], 173.24 [s, 10, (C$_6$H$_4$N$_2$CH(CH$_3$)$_2$CSi(CH$_3$)$_2$)$_3$CMgOC(O)H], not observed [(C$_6$H$_4$N$_2$CH(CH$_3$)$_2$CSi(CH$_3$)$_2$)$_3$CMgOC(O)H].

$^{29}$Si NMR (C$_6$D$_6$): -10.36 [s, 3Si, (C$_6$H$_4$N$_2$CH(CH$_3$)$_2$C$\underline{Si}$(CH$_3$)$_2$)$_3$CMgOC(O)H].

IR Data (ATR, cm$^{-1}$): 1577 (m), 1465 (w), 1393 (w), 1356 (w), 1329 (w), 1248 (w), 1067 (w), 939 (s), 905 (s), 828 (m), 815 (m), 795 (m), 764 (w), 741 (s), 686 (m), 502 (m), 444 (w).

Preparation of {[Tism$^{Pr^jBenz}$]Mg}[HB(C$_6$F$_5$)$_3$]

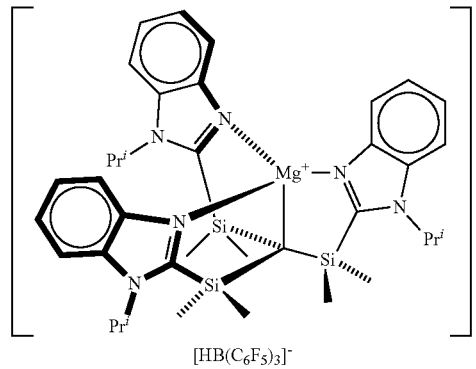

[HB(C$_6$F$_5$)$_3$]$^-$

A solution of [Tism$^{Pr^jBenz}$]MgH (10 mg, 0.015 mmol) in benzene (ca 0.5 mL) was added dropwise to a solution of B(C$_6$F$_5$)$_3$ (7.4 mg, 0.014 mmol) in benzene (ca 0.5 mL). The solution was allowed to stand for 30 minutes, during which period crystals suitable for X-ray diffraction were deposited. The colorless crystals of {[Tism$^{Pr^jBenz}$]Mg}{HB(C$_6$F$_5$)$_3$} were collected and washed with benzene (1 mL) and then pentane (1 mL), and dried in vacuo (6 mg, 34%).

$^1$H NMR (C$_6$D$_6$):

0.30 [s, 18H, (C$_6$H$_4$N$_2$CH(CH$_3$)$_2$CSi(C$\underline{H}_3$)$_2$)$_3$ CMgHB(C$_6$F$_6$)$_3$], 1.18 [d, J=7 Hz, 18H, (C$_6$H$_4$N$_2$CH(C$\underline{H}_3$)$_2$ CSi(CH$_3$)$_2$)$_3$ CMgHB(C$_6$F$_5$)$_3$], 4.55 [sep, J=7 Hz, 3H, (C$_6$H$_4$N$_2$C$\underline{H}$(CH$_3$)$_2$ CSi(CH$_3$)$_2$)$_3$ CMgHB(C$_6$F$_5$)$_3$], 7.00 [t, J=7 Hz, 3H, (C$_6\underline{H}_4$N$_2$CH(CH$_3$)$_2$CSi(CH$_3$)$_2$)$_3$ CMgHB(C$_6$F$_5$)$_3$], 7.11 [m, 6H, obscured by solvent, (C$_6\underline{H}_4$N$_2$ CH(CH$_3$)$_2$ CSi(CH$_3$)$_2$)$_3$CMgHB(C$_6$F$_5$)$_3$], 7.73 [d, J=8 Hz, 3H, (C$_6\underline{H}_4$N$_2$CH(CH$_3$)$_2$CSi(CH$_3$)$_2$)$_3$ CMgHB(C$_6$F$_6$)$_3$], not observed [1H, (C$_6$H$_4$N$_2$CH(CH$_3$)$_2$CSi(CH$_3$)$_2$)$_3$CMg $\underline{H}$B(C$_6$F$_5$)$_3$].

$^{19}$F NMR (C$_6$D$_6$):

-166.00 [meta, br, 6F, (C$_6$H$_4$N$_2$CH(CH$_3$)$_2$CSi(CH$_3$)$_2$)$_3$ CMgHB(C$_6\underline{F}_6$)$_3$], -163.49 [para, br, 3F, (C$_6$H$_4$N$_2$CH(CH$_3$)$_2$CSi(CH$_3$)$_2$)$_3$ CMgHB(C$_6\underline{F}_6$)$_3$], -131.30 [ortho, br, 6F, (C$_6$H$_4$N$_2$CH(CH$_3$)$_2$CSi(CH$_3$)$_2$)$_3$ CMgHB(C$_6\underline{F}_5$)$_3$].

IR Data (ATR, cm$^{-1}$): 2946 (w), 1639 (w), 1508 (w), 1461 (s), 1405 (w), 1360 (m), 1319 (w), 1276 (w), 1260 (w), 1161 (w), 1064 (m), 968 (m), 940 (vs), 826 (s), 813 (s), 791 (m), 735 (s), 696 (w), 683 (w), 649 (w), 621 (w), 561 (w), 543 (w), 531 (w), 502 (w), 443 (m).

Preparation of [Tism$^{Pr^iBenz}$]MgOC(H)OB(C$_6$F$_5$)$_3$

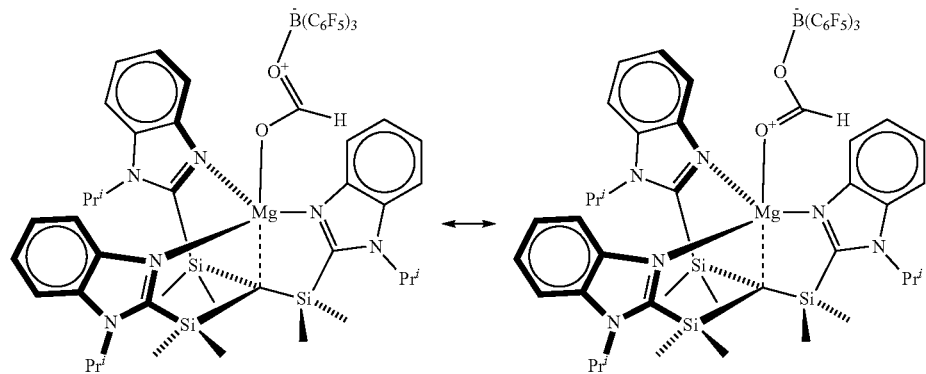

Three preparation methods were employed:

(i) A suspension of [Tism$^{Pr^iBenz}$]MgH (3 mg, 0.004 mmol) and B(C$_6$F$_5$)$_3$ (2.2 mg, 0.004 mmol) in benzene (0.7 mL) was treated with CO$_2$ (1 atm). The sample was shaken intermittently and the mixture was decanted after 30 minutes to afford [Tism$^{Pr^iBenz}$]MgOC(H)OB(C$_6$F$_5$)$_3$ as a white powder (4 mg, 74%). Colorless crystals suitable for X-ray diffraction were obtained via vapor diffusion of pentane into a concentrated benzene solution.

(ii) A suspension of {[Tism$^{Pr^iBenz}$]Mg}{HB(C$_6$F$_5$)$_3$} (8 mg, 0.007 mmol) in C$_6$D$_6$ was treated with CO$_2$ (1 atm) and the immediate formation of [Tism$^{Pr^iBenz}$]MgOC(H)OB(C$_6$F$_5$)$_3$ was demonstrated by $^1$H NMR spectroscopy.

(iii) A suspension of [Tism$^{Pr^iBenz}$]Mg(k$^2$-O$_2$CH) (3 mg, 0.004 mmol) in C$_6$D$_6$ (ca 0.7 mL) was treated with B(C$_6$F$_5$)$_3$ (ca. 1.25 equiv.) and the formation of [Tism$^{Pr^iBenz}$]MgOC(H)OB(C$_6$F$_5$)$_3$ was demonstrated by $^1$H NMR spectroscopy.

$^1$H NMR (C$_6$D$_6$):
0.27 [s, 18H, (C$_6$H$_4$N$_2$CH(CH$_3$)$_2$CSi(CH$_3$)$_2$)$_3$CMgO(H)COB(C$_6$F$_5$)$_3$],
1.10 [d, J=7 Hz, 18H, (C$_6$H$_4$N$_2$CH(CH$_3$)$_2$CSi(CH$_3$)$_2$)$_3$CMgO(H)COB(C$_6$F$_5$)$_3$],
4.50 [sep, J=7 Hz, 3H, (C$_6$H$_4$N$_2$CH(CH$_3$)$_2$CSi(CH$_3$)$_2$)$_3$CMgO(H)COB(C$_6$F$_5$)$_3$],
7.02 [m, 3H, (C$_6$H$_4$N$_2$CH(CH$_3$)$_2$CSi(CH$_3$)$_2$)$_3$CMgO(H)COB(C$_6$F$_5$)$_3$],
7.13 [m, 6H, (C$_6$H$_4$N$_2$CH(CH$_3$)$_2$CSi(CH$_3$)$_2$)$_3$CMgO(H)COB(C$_6$F$_5$)$_3$],
8.27 [d, J=7 Hz, 3H, (C$_6$H$_4$N$_2$CH(CH$_3$)$_2$CSi(CH$_3$)$_2$)$_3$CMgO(H)COB(C$_6$F$_5$)$_3$],
8.76 [s, 1H, (C$_6$H$_4$N$_2$CH(CH$_3$)$_2$CSi(CH$_3$)$_2$)$_3$CMgO(H)COB(C$_6$F$_5$)$_3$].

$^1$H NMR (C$_6$D$_5$Br):
0.24 [s, 18H, (C$_6$H$_4$N$_2$CH(CH$_3$)$_2$CSi(CH$_3$)$_2$)$_3$CMgO(H)COB(C$_6$F$_5$)$_3$],
1.30 [d, J=7 Hz, 18H, (C$_6$H$_4$N$_2$CH(CH$_3$)$_2$CSi(CH$_3$)$_2$)$_3$CMgO(H)COB(C$_6$F$_5$)$_3$],
4.64 [sep, J=7 Hz, 3H, (C$_6$H$_4$N$_2$CH(CH$_3$)$_2$CSi(CH$_3$)$_2$)$_3$CMgO(H)COB(C$_6$F$_5$)$_3$],
7.08 [m, 6H, (C$_6$H$_4$N$_2$CH(CH$_3$)$_2$CSi(CH$_3$)$_2$)$_3$CMgO(H)COB(C$_6$F$_5$)$_3$],
7.26 [m, 3H, (C$_6$H$_4$N$_2$CH(CH$_3$)$_2$CSi(CH$_3$)$_2$)$_3$CMgO(H)COB(C$_6$F$_5$)$_3$],
8.14 [m, 3H, (C$_6$H$_4$N$_2$CH(CH$_3$)$_2$CSi(CH$_3$)$_2$)$_3$CMgO(H)COB(C$_6$F$_5$)$_3$],
8.73 [s, 1H, (C$_6$H$_4$N$_2$CH(CH$_3$)$_2$CSi(CH$_3$)$_2$)$_3$CMgO(H)COB(C$_6$F$_5$)$_3$].

$^{13}$C{$^1$H} NMR (C$_6$D$_5$Br):
3.95 [s, 6C, (C$_6$H$_4$N$_2$CH(CH$_3$)$_2$CSi(CH$_3$)$_2$)$_3$CMgO(H)COB(C$_6$F$_5$)$_3$],
20.78 [s, 6C, (C$_6$H$_4$N$_2$CH(CH$_3$)$_2$CSi(CH$_3$)$_2$)$_3$CMgO(H)COB(C$_6$F$_5$)$_3$],
50.16 [s, 3C, (C$_6$H$_4$N$_2$CH(CH$_3$)$_2$CSi(CH$_3$)$_2$)$_3$CMgO(H)COB(C$_6$F$_5$)$_3$],
112.58 [s, 3C, (C$_6$H$_4$N$_2$CH(CH$_3$)$_2$CSi(CH$_3$)$_2$)$_3$CMgO(H)COB(C$_6$F$_5$)$_3$],
119.40 [s, 3C, (C$_6$H$_4$N$_2$CH(CH$_3$)$_2$CSi(CH$_3$)$_2$)$_3$CMgO(H)COB(C$_6$F$_5$)$_3$],
122.72 [s, 3C, (C$_6$H$_4$N$_2$CH(CH$_3$)$_2$CSi(CH$_3$)$_2$)$_3$CMgO(H)COB(C$_6$F$_5$)$_3$],
123.10 [s, 3C, (C$_6$H$_4$N$_2$CH(CH$_3$)$_2$CSi(CH$_3$)$_2$)$_3$CMgO(H)COB(C$_6$F$_5$)$_3$],
133.56 [s, 3C, (C$_6$H$_4$N$_2$CH(CH$_3$)$_2$CSi(CH$_3$)$_2$)$_3$CMgO(H)COB(C$_6$F$_5$)$_3$],
142.60 [s, 3C, (C$_6$H$_4$N$_2$CH(CH$_3$)$_2$CSi(CH$_3$)$_2$)$_3$CMgO(H)COB(C$_6$F$_5$)$_3$],
167.38 [s, 3C, (C$_6$H$_4$N$_2$CH(CH$_3$)$_2$CSi(CH$_3$)$_2$)$_3$CMgO(H)COB(C$_6$F$_5$)$_3$],
170.84 [s, 10, (C$_6$H$_4$N$_2$CH(CH$_3$)$_2$CSi(CH$_3$)$_2$)$_3$CMgO(H)COB(C$_6$F$_5$)$_3$],
not observed/obscured by solvent [(C$_6$H$_4$N$_2$CH(CH$_3$)$_2$CSi(CH$_3$)$_2$)$_3$CMgO(H)COB(C$_6$F$_5$)$_3$].

$^{19}$F NMR (C$_6$D$_5$Br):
−163.4 [meta, m, 6F, (C$_6$H$_4$N$_2$CH(CH$_3$)$_2$CSi(CH$_3$)$_2$)$_3$CMgO(H)COB(C$_6$F$_5$)$_3$],
−157.6 [para, t, J=21 Hz, 3F, (C$_6$H$_4$N$_2$CH(CH$_3$)$_2$CSi(CH$_3$)$_2$)$_3$CMgO(H)COB(C$_6$F$_5$)$_3$],
−132.6 [ortho, m, 6F, (C$_6$H$_4$N$_2$CH(CH$_3$)$_2$CSi(CH$_3$)$_2$)$_3$CMgO(H)COB(C$_6$F$_5$)$_3$].

$^{29}$Si NMR (C$_6$D$_5$Br): −10.71 [s, 3Si, (C$_6$H$_4$N$_2$CH(CH$_3$)$_2$CSi(CH$_3$)$_2$)$_3$CMgO(H)COB(C$_6$F$_5$)$_3$].

$^{11}$B NMR (C$_6$D$_5$Br): −6.97 [b, 1B, (C$_6$H$_4$N$_2$CH(CH$_3$)$_2$CSi(CH$_3$)$_2$)$_3$CMgO(H)COB(C$_6$F$_5$)$_3$].

IR Data (ATR, cm$^{-1}$): 2945 (w), 1665 (s), 1645 (m), 1515 (m), 1461 (vs), 1387 (m), 1373 (s), 1357 (m), 1321 (s), 1280 (m), 1259 (m), 1160 (m), 1135 (w), 1095 (s), 1067 (m), 981 (s), 969 (s), 943 (vs), 916 (vs), 825 (vs), 812 (vs), 791 (s), 783 (s), 775 (m), 764 (m), 751 (vs), 739 (vs), 685 (s), 674 (vs), 616 (m), 602 (m), 577 (m), 560 (s), 531 (m), 514 (m), 498 (m), 443 (s).

Example 3

Catalytic Hydrosilylation of Styrene

A general route to obtain the Markovnikov product, Ph(Me)C(H)SiH$_2$Ph, by the hydrosilylation of styrene using [Tism$^{Pr^iBenz}$]MgH as catalyst, is illustrated below (Scheme 1). Detailed preparations starting from [Tism$^{Pr^iBenz}$]MgMe (i) or [Tism$^{Pr^iBenz}$]MgH (ii) are also provided.

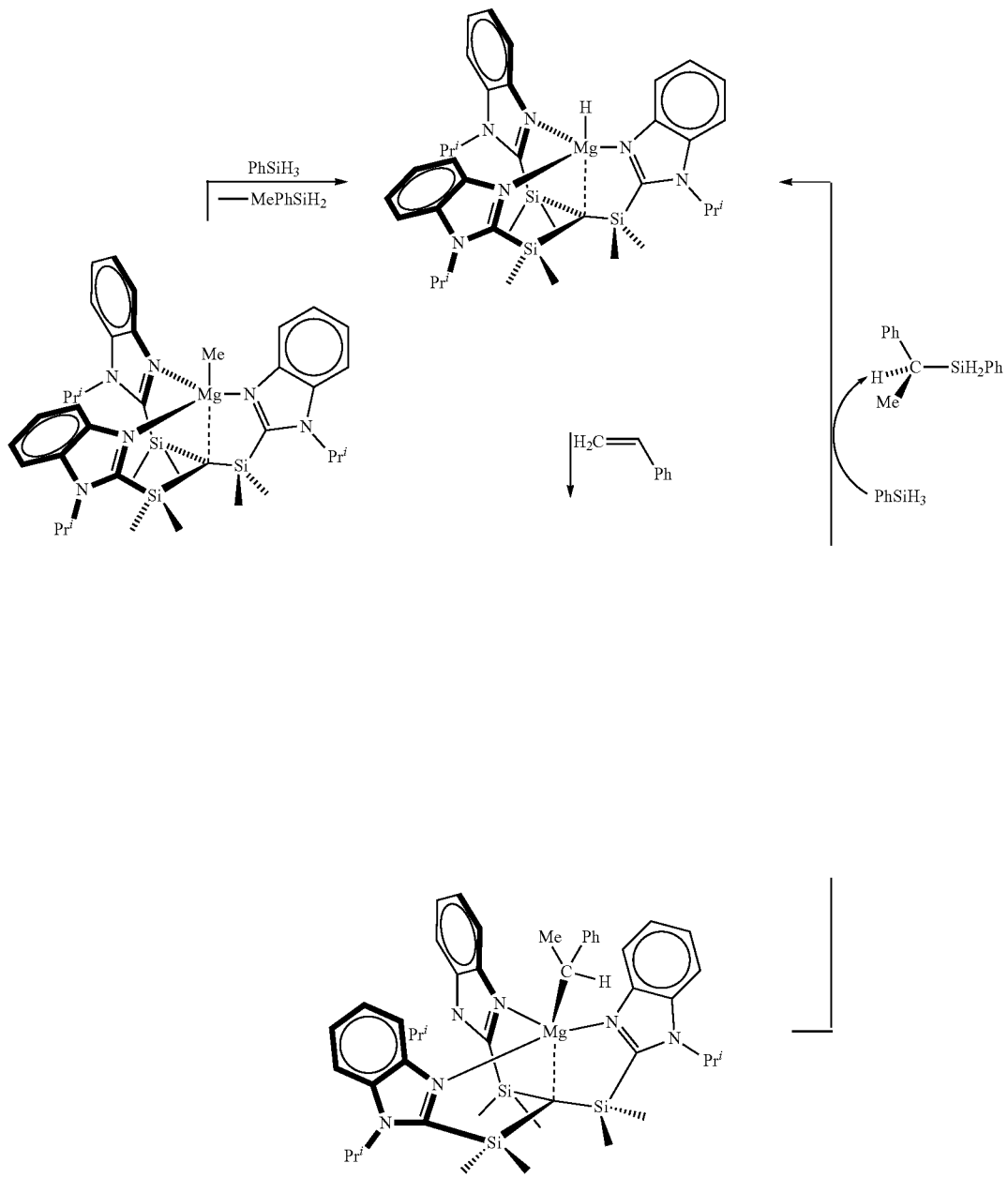

Scheme 1: Synthetic scheme for Ph(Me)C(H)SiH$_2$Ph using [Tism$^{Pr^iBenz}$]MgH as catalyst.

(i) A solution of phenylsilane (15 equiv, 0.107 mmol) and styrene (10 equiv, 0.071 mmol) in C$_6$D$_6$ (0.7 mL), with mesitylene (2 equiv, 0.014 mmol) as an internal standard, was added to [Tism$^{Pr^iBenz}$]MgMe (5 mg, 0.007 mmol) in an NMR tube equipped with a J. Young valve. The solution was heated at 60° C. and monitored regularly by $^1$H NMR spectroscopy, thereby demonstrating the formation of Ph(Me)C(H)SiH$_2$Ph by comparison to literature data. Substrate consumption was complete in 10 hours, after which point integration of the hydrosilylation product with respect to mesitylene indicated a TOE of 0.9 h$^{-1}$.

(ii) A solution of phenylsilane (15 equiv, 0.044 mmol) and styrene (10 equiv, 0.029 mmol) in C$_6$D$_6$ (0.7 mL) was added to [Tism$^{Pr^iBenz}$]MgH (2 mg, 0.003 mmol) in an NMR tube equipped with a J. Young valve. The solution was heated at 60° C. and monitored regularly by $^1$H NMR spectroscopy, thereby demonstrating the formation of Ph(Me)C(H)SiH$_2$Ph.

Example 4

Catalytic Hydroboration of Styrene

A general route to obtain the Markovnikov product, Ph(Me)C(H)Bpin, by the hydroboration of styrene using [Tism$^{Pr^iBenz}$]MgH as catalyst, is illustrated below (Scheme 2). Detailed preparations starting from [Tism$^{Pr^iBenz}$]MgMe (i) or [Tism$^{Pr^iBenz}$]MgH (ii) are also provided.

Scheme 2: Synthetic scheme for Ph(Me)C(H)Bpin using [Tism$^{Pr^{i}Benz}$]MgH as catalyst.

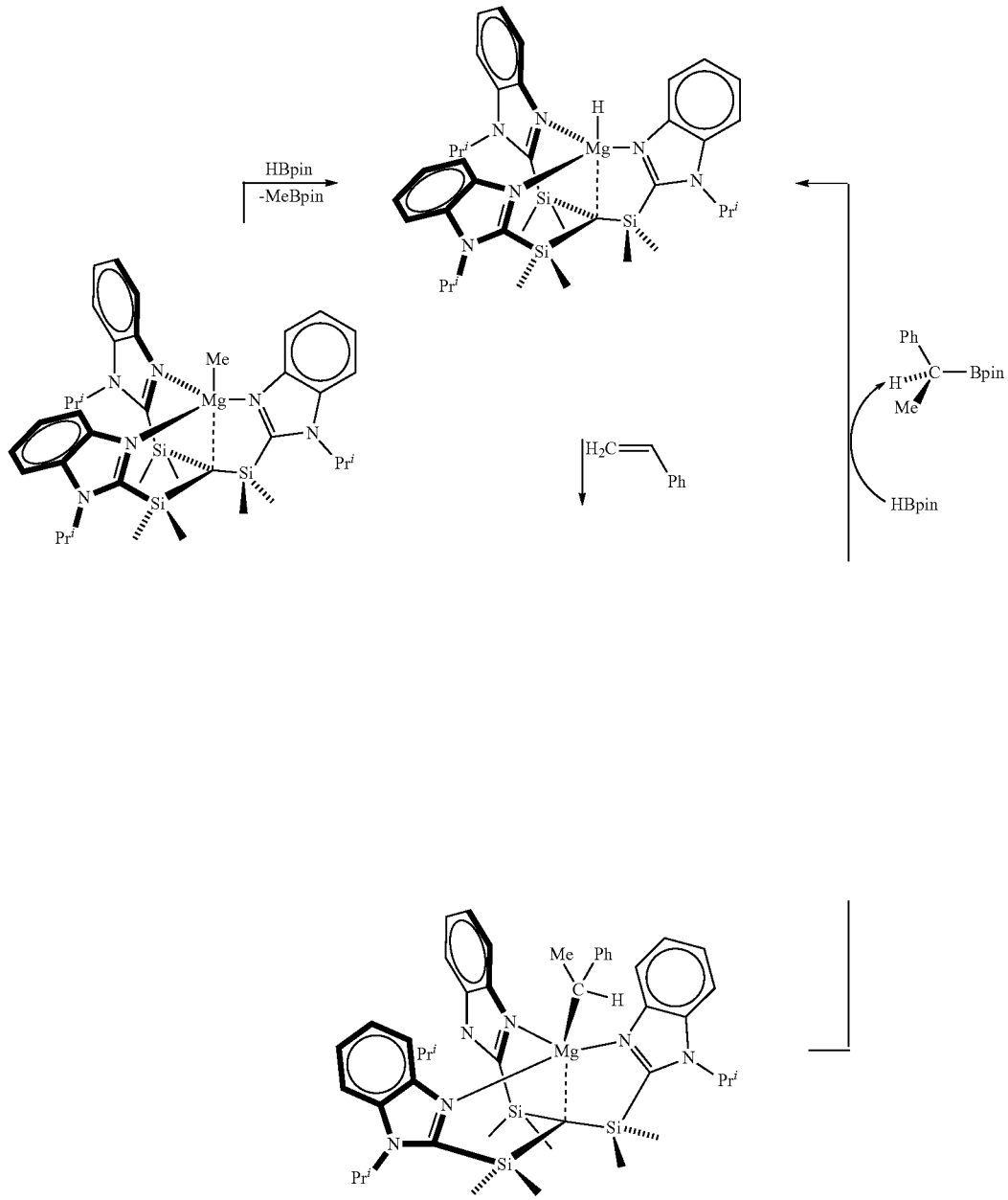

(i) A solution of pinacolborane (15 equiv, 0.107 mmol) and styrene (10 equiv, 0.071 mmol) in $C_6D_6$ (0.7 mL), with mesitylene (2 equiv, 0.014 mmol) as an internal standard, was added to [Tism$^{Pr^{i}Benz}$]MgMe (5 mg, 0.007 mmol) in an NMR tube equipped with a J. Young valve. The solution was heated at 60° C. and monitored regularly by $^1$H NMR spectroscopy, thereby demonstrating the formation of Ph(Me)C(H)Bpin by comparison to literature data, after removing volatile components and redissolving in CDCl$_3$. Substrate consumption was complete in 32 hours, after which point integration of the hydroboration product with respect to mesitylene indicated a TOF of 0.3 h$^{-1}$.

(ii) A solution of pinacolborane (15 equiv, 0.044 mmol) and styrene (10 equiv, 0.029 mmol) in $C_6D_6$ (0.7 mL) was added to [Tism$^{Pr^{i}Benz}$]MgH (2 mg, 0.003 mmol) in an NMR tube equipped with a J. Young valve. The solution was heated at 60° C. and monitored regularly by $^1$H NMR spectroscopy, thereby demonstrating the formation of Ph(Me)C(H)Bpin.

Example 5

Catalytic Hydrosilylation of Carbon Dioxide

The catalytic cycle for the hydrosilylation of $CO_2$ by magnesium or zinc system is summarized below (Scheme 3). Exemplary preparations are also provided. Selected results are shown in Table 1.

Scheme 3: Catalytic cycle for the hydrosilylation of CO₂ by magnesium or zinc system.

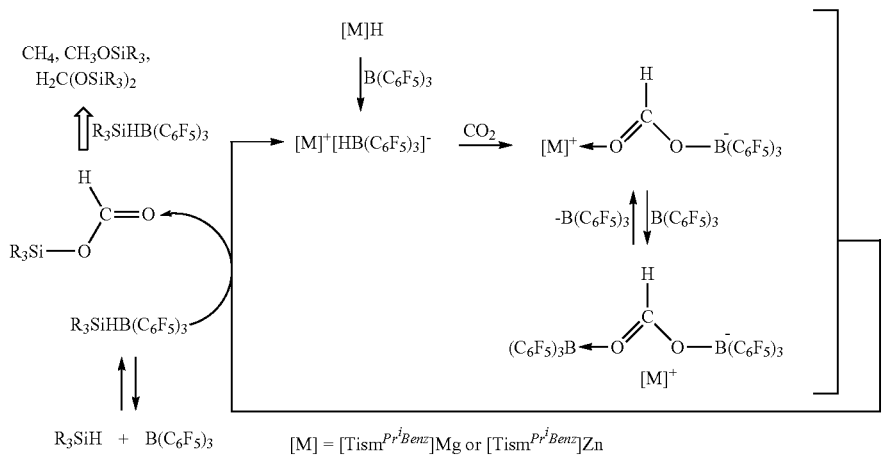

Magnesium System:

(a) A solution of PhSiH$_3$ (0.14 mmol) and mesitylene in C$_6$D$_6$ (ca 0.5 mL) was added to a mixture of [Tism$^{Pr^iBenz}$]MgH (0.0028 mmol) and B(C$_6$F$_5$)$_3$ (0.014 mmol) in an NMR tube equipped with a J. Young valve. The sample was treated with CO$_2$ (1 atm) and monitored by $^1$H and $^{19}$F NMR spectroscopy. Products were identified by comparison to literature values and TONs were determined by integration with respect to the mesitylene internal standard.

(b) A solution of Et$_3$SiH (0.14 mmol) and mesitylene in C$_6$D$_6$ (ca 0.5 mL) was added to a mixture of [Tism$^{Pr^iBenz}$]MgH (0.0028 mmol) and B(C$_6$F$_5$)$_3$ (0.014 mmol) in an NMR tube equipped with a J. Young valve. The sample was treated with CO$_2$ (1 atm) and monitored by $^1$H and $^{19}$F NMR spectroscopy. Products were identified by comparison to literature values and TONs were determined by integration with respect to the mesitylene internal standard.

(c) A solution of Ph$_3$SiH (0.14 mmol) and mesitylene in C$_6$D$_6$ (ca 0.5 mL) was added to a mixture of [Tism$^{Pr^iBenz}$]MgH (0.0028 mmol) and B(C$_6$F$_5$)$_3$ (0.014 mmol) in an NMR tube equipped with a J. Young valve. The sample was treated with CO$_2$ (1 atm) and monitored by $^1$H and $^{19}$F NMR spectroscopy. Products were identified by comparison to literature values and TONs were determined by integration with respect to the mesitylene internal standard.

(d) A solution of PhSiH$_3$ (1.42 mmol), [Tism$^{Pr^iBenz}$]MgH (0.007 mmol), B(C$_6$F$_5$)$_3$ (0.035 mmol) and mesitylene in C$_6$D$_6$ (ca 1.5 mL) in an ampoule was treated with CO$_2$ (1 atm) and the products were analyzed after a period of 14 hours by comparison to the literature NMR data and TONs were determined by integration with respect to the mesitylene internal standard.

(e) A solution of Et$_3$SiH (1.42 mmol), [Tism$^{Pr^iBenz}$]MgH (0.007 mmol), B(C$_6$F$_5$)$_3$ (0.035 mmol) and mesitylene in C$_6$D$_6$ (ca 1.5 mL) in an ampoule was treated with CO$_2$ (1 atm) and the products were analyzed after a period of 70 hours by comparison to the literature NMR data and TONs were determined by integration with respect to the mesitylene internal standard.

(f) A solution of Ph$_3$SiH (1.42 mmol), [Tism$^{Pr^iBenz}$]MgH (0.007 mmol), B(C$_6$F$_5$)$_3$ (0.035 mmol) and mesitylene in C$_6$D$_6$ (ca 1.5 mL) in an ampoule was treated with CO$_2$ (1 atm) and the products were analyzed after a period of 70 hours by comparison to the literature NMR data and TONs were determined by integration with respect to the mesitylene internal standard.

(g) A solution of PhSiH$_3$ (0.14 mmol) and mesitylene in C$_6$D$_6$ (ca 0.5 mL) was added to a mixture of [Tism$^{Pr^iBenz}$]MgMe (0.0028 mmol) and B(C$_6$F$_5$)$_3$ (0.014 mmol) in an NMR tube equipped with a J. Young valve. The sample was treated with CO$_2$ (1 atm) and monitored by $^1$H and $^{19}$F NMR spectroscopy. Products were identified by comparison to literature values and TONs were determined by integration with respect to the mesitylene internal standard.

(h) A solution of Et$_3$SiH (0.14 mmol) and mesitylene in C$_6$D$_6$ (ca 0.5 mL) was added to a mixture of [Tism$^{Pr^iBenz}$]MgMe (0.0028 mmol) and B(C$_6$F$_5$)$_3$ (0.014 mmol) in an NMR tube equipped with a J. Young valve. The sample was treated with CO$_2$ (1 atm) and monitored by $^1$H and $^{19}$F NMR spectroscopy. Products were identified by comparison to literature values and TONs were determined by integration with respect to the mesitylene internal standard.

(i) A solution of Ph$_3$SiH (0.14 mmol) and mesitylene in C$_6$D$_6$ (ca 0.5 mL) was added to a mixture of [Tism$^{Pr^iBenz}$]MgMe (0.0028 mmol) and B(C$_6$F$_5$)$_3$ (0.014 mmol) in an NMR tube equipped with a J. Young valve. The sample was treated with CO$_2$ (1 atm) and monitored by $^1$H and $^{19}$F NMR spectroscopy. Products were identified by comparison to literature values and TONs were determined by integration with respect to the mesitylene internal standard.

(j) A solution of PhSiH$_3$ (1.42 mmol), [Tism$^{Pr^iBenz}$]MgMe (0.007 mmol), B(C$_6$F$_5$)$_3$ (0.035 mmol) and mesitylene in C$_6$D$_6$ (ca 1.5 mL) in an ampoule was treated with CO$_2$ (1 atm) and the products were analyzed after a period of 14 hours by comparison to the literature NMR data and TONs were determined by integration with respect to the mesitylene internal standard.

(k) A solution of Et$_3$SiH (1.42 mmol), [Tism$^{Pr^iBenz}$]MgMe (0.007 mmol), B(C$_6$F$_5$)$_3$ (0.035 mmol) and mesitylene in C$_6$D$_6$ (ca 1.5 mL) in an ampoule was treated with CO$_2$ (1 atm) and the products were analyzed after a period of 72 hours by comparison to the literature NMR data and TONs were determined by integration with respect to the mesitylene internal standard.

(l) A solution of Ph$_3$SiH (1.42 mmol), [Tism$^{Pr^iBenz}$]MgMe (0.007 mmol), B(C$_6$F$_5$)$_3$ (0.035 mmol) and mesitylene in C$_6$D$_6$ (ca 1.5 mL) in an ampoule was treated with CO$_2$ (1 atm) and the products were analyzed after a period of 72 hours by comparison to the literature NMR data and TONs were determined by integration with respect to the mesitylene internal standard.

(m) A solution of $PhSiH_3$ (0.14 mmol) in $C_6D_6$ (ca 0.5 mL) was added to a mixture of $[Tism^{Pr^iBenz}]MgMe$ (0.0014 mmol) and $B(C_6F_5)_3$ (0.0078 mmol) in an NMR tube equipped with a J. Young valve. The sample was treated with $CO_2$ (1 atm) and monitored by $^1H$ spectroscopy. Upon complete consumption of $PhSiH_3$, $CH_4$ and excess $CO_2$ were removed via a freeze-pump-thaw cycle. The sample was then reloaded with $PhSiH_3$ (0.14 mmol) and $CO_2$ (1 atm), and the process was repeated for a cumulative total of 8 cycles of silane consumption without any substantial loss of activity.

Zinc System:

(a) A solution of $PhSiH_3$ (0.037 mmol) and mesitylene in $C_6D_5Br$ (ca 0.5 mL) was added to a mixture of $\{[Tism^{Pr^iBenz}]Zn\}[HB(C_6F_5)_3]$ (0.0008 mmol) and $B(C_6F_5)_3$ (0.002 mmol) in an NMR tube equipped with a J. Young valve. The sample was treated with $CO_2$ (1 atm) and monitored by $^1H$ and $^{19}F$ NMR spectroscopy. Products were identified by comparison to literature values and TONs were determined by integration with respect to the mesitylene internal standard.

(b) A solution of $Et_3SiH$ (0.014 mmol) and mesitylene in $C_6D_5Br$ (ca 0.5 mL) was added to a mixture of $\{[Tism^{Pr^iBenz}]Zn\}[HB(C_6F_5)_3]$ (0.0028 mmol) and $B(C_6F_5)_3$ (0.0011 mmol) in an NMR tube equipped with a J. Young valve. The sample was treated with $CO_2$ (1 atm) and monitored by $^1H$ and $^{19}F$ NMR spectroscopy. Products were identified by comparison to literature values and TONs were determined by integration with respect to the mesitylene internal standard.

(c) A solution of $Ph_3SiH$ (0.014 mmol) and mesitylene in $C_6D_5Br$ (ca 0.5 mL) was added to a mixture of $\{[Tism^{Pr^iBenz}]Zn\}[HB(C_6F_5)_3]$ (0.0028 mmol) and $B(C_6F_5)_3$ (0.0011 mmol) in an NMR tube equipped with a J. Young valve. The sample was treated with $CO_2$ (1 atm) and monitored by $^1H$ and $^{19}F$ NMR spectroscopy. Products were identified by comparison to literature values and TONs were determined by integration with respect to the mesitylene internal standard.

(d) A solution of $PhSiH_3$ (0.11 mmol) in $C_6D_6$ (ca 0.5 mL) was added to a mixture of $[Tism^{Pr^iBenz}]ZnH$ (0.0027 mmol) and $B(C_6F_5)_3$ (0.055 mmol) in an NMR tube equipped with a J. Young valve. The sample was treated with $CO_2$ (1 atm) and monitored by $^1H$ and $^{19}F$ NMR spectroscopy, thereby demonstrating the catalytic conversion to $CH_4$.

TABLE 1

Selected results for catalytic hydrosilylation of $CO_2$.

| catalyst[a] | $R_3SiH$ | product | TON[b] (TOF/h$^{-1}$) |
|---|---|---|---|
| [Mg] (0.5%)/[B] (2.5%)[c] | $PhSiH_3$ | $CH_4$ | 542, 416[d] (38.7, 29.7)[d] |
| [Mg] (0.5%)/[B] (2.5%)[c] | $Ph_3SiH$ | $H_2C(OSiPh_3)_2$ | 83, 178[d] (1.2, 2.5)[d] |
| [Zn] (2.5%)/[B] (5.0%)[e] | $PhSiH_3$ | $CH_4$ | 117 (0.8) |
| [Zn] (2.0%)/[B] (10.0%)[e] | $Ph_3SiH$ | $H_2C(OSiPh_3)_2$ | 12 (0.1) |

[a][Mg] = $[Tism^{Pr^iBenz}]MgH$ or $[Tism^{Pr^iBenz}]MgMe$; [Zn] = $\{[Tism^{Pr^iBenz}] - Zn\}[HB(C_6F_5)_3]$; [B] = $B(C_6F_5)_3$.
[b]Number of Si—H bonds consumed per metal.
[c]$C_6D_6$.
[d]Values for $[Tism^{Pr^iBenz}]MgH$ listed first.
[e]$C_6D_5Br$.

Example 6

Preparation of Formaldehyde Equivalent from Carbon Dioxide

A general route to obtain a formaldehyde equivalent from $CO_2$ using the metal complexes disclosed herein as catalyst is illustrated below (Scheme 4). Detailed preparation is also provided.

Scheme 4: Preparation of formaldehyde equivalent from $CO_2$ using metal complexes as catalyst.

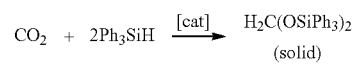

Exemplary procedures are provided below.

(a) A solution of $Ph_3SiH$ (0.14 mmol) and mesitylene in $C_6D_6$ (ca 0.5 mL) was added to a mixture of $[Tism^{Pr^iBenz}]MgH$ (0.0028 mmol) and $B(C_6F_5)_3$ (0.014 mmol) in an NMR tube equipped with a J. Young valve. The sample was treated with $CO_2$ (1 atm) and monitored by $^1H$ and $^{19}F$ NMR spectroscopy. Products were identified by comparison to literature values and TONs were determined by integration with respect to the mesitylene internal standard.

(b) A solution of $Ph_3SiH$ (1.42 mmol), $[Tism^{Pr^iBenz}]MgH$ (0.007 mmol), $B(C_6F_5)_3$ (0.035 mmol) and mesitylene in $C_6D_6$ (ca 1.5 mL) in an ampoule was treated with $CO_2$ (1 atm) and the products were analyzed after a period of 70 hours by comparison to the literature NMR data and TONs were determined by integration with respect to the mesitylene internal standard.

(c) A solution of $Ph_3SiH$ (0.14 mmol) and mesitylene in $C_6D_6$ (ca 0.5 mL) was added to a mixture of $[Tism^{Pr^iBenz}]MgMe$ (0.0028 mmol) and $B(C_6F_5)_3$ (0.014 mmol) in an NMR tube equipped with a J. Young valve. The sample was treated with $CO_2$ (1 atm) and monitored by $^1H$ and $^{19}F$ NMR spectroscopy. Products were identified by comparison to literature values and TONs were determined by integration with respect to the mesitylene internal standard.

(d) A solution of $Ph_3SiH$ (1.42 mmol), $[Tism^{Pr^iBenz}]MgMe$ (0.007 mmol), $B(C_6F_5)_3$ (0.035 mmol) and mesitylene in $C_6D_6$ (ca 1.5 mL) in an ampoule was treated with $CO_2$ (1 atm) and the products were analyzed after a period of 72 hours by comparison to the literature NMR data and TONs were determined by integration with respect to the mesitylene internal standard.

Example 7

Use of Metal Complexes to Reduce Carbon Monoxide

A catalyst is treated with carbon monoxide (1 atm) and 10-1000 equivalents of a hydrosilane ($R_3SiH$) or hydroborane ($R_2BH$), resulting in the catalytic formation of the reduced species.

Example 8

Catalytic Hydrogenation of Alkenes/Alkynes

A catalyst is treated with hydrogen (1-20 atm) and 10-1000 equivalents of an alkene or alkyne, resulting in the catalytic formation of the hydrogenated species.

Example 9

Catalytic Polymerization of Alkenes

A catalyst is treated with an alkene (10-1000 equivalents), resulting in the catalytic formation of the polymerized species.

Example 10

Catalytic Production of Hydrogen-On-Demand from Alcohols/Amines

A catalyst is treated with an alcohol or primary or secondary amine (10-1000 equivalents) and 10-1000 equivalents of a hydrosilane ($R_3SiH$) or hydroborane ($R_2BH$), resulting in the catalytic formation of hydrogen.

Example 11

Catalytic Hydrosilylation of Ketones/Aldehydes

A catalyst is treated with a ketone or aldehyde (10-1000 equivalents) and 10-1000 equivalents of a hydrosilane ($R_3SiH$) or hydroborane ($R_2BH$), resulting in the catalytic formation of the corresponding hydrosilylated or hydroborated products.

Example 12

Tishchenko Reaction Using Metal Complexes

A catalyst is treated with an aldehyde (10-1000 equivalents), resulting in the catalytic formation of the corresponding ester.

Example 13

Catalytic Hydrogenation of Carbon Dioxide

A catalyst is treated with carbon dioxide (1-20 atm) and hydrogen (1-20 atm) resulting in the catalytic formation of a hydrogenated species such as, e.g., methanol, formic acid, methane, formaldehyde, etc.

Example 14

Catalytic Hydrogenation of Carbon Monoxide

A catalyst is treated with carbon monoxide (1-20 atm) and hydrogen (1-20 atm) resulting in the catalytic formation of a hydrogenated species such as, e.g., methanol, formic acid, methane, formaldehyde, etc.

DOCUMENTS CITED

Harder, S. *Chem. Commun.* 2012, 48, 11165.
Sarish, S. P.; Nembenna, S.; Nagendran, S.; Roesky, H. W. *Acc. Chem. Res.* 2011, 44, 157.
Rochat, R.; Lopez, M. J.; Tsurugi, H.; Mashima, K. *ChemCatChem* 2016, 8, 10.
Hill, M. S.; Liptrot, D. J.; Weetman, C. *Chem. Soc. Rev.* 2016, 45, 972.
Arrowsmith, M. *Enc. Inorg. Bioinorg. Chem.* 2015, 1-26.
Crimmin, M. R.; Hill, M. S. Top. *Organomet. Chem.* 2013, 45, 191.
Revunova, K.; Nikonov, G. I. *Dalton Trans.* 2015, 44, 840.
Dunne, J. F.; Neal, S. R.; Engelkemier, J.; Ellern, A.; Sadow, A. D. *J. Am. Chem. Soc.* 2011, 133, 16782.
Schnitzler, S.; Spaniol, T. P.; Okuda, *J. Inorg. Chem.* 2016, 55, 12997.
Spielmann, J.; Buch, F.; Harder, S. *Angew. Chem., Int. Ed.* 2008, 47, 9434.
Buch, F.; Brettar, J.; Harder, S. *Angew. Chem., Int. Ed.* 2006, 45, 2741.
Meister, T. K.; Riener, K.; Gigler, P.; Stohrer, J.; Herrmann, W. A.; Kuhn, F. E. *ACS Catal.* 2016, 6, 1274.
Aresta, M., Ed. *Carbon Dioxide as a Chemical Feedstock*; Wiley-VCH: Weinheim, 2010.
Liu, Q.; Wu, L. P.; Jackstell, R.; Beller, M. *Nat. Commun.* 2015, 6, 5933.
Fraga, E. S.; Ng, M. *Faraday Discuss.* 2015, 183, 309.

Four Appendices (A to D) are attached hereto which provide additional details regarding the inventive principles described in this disclosure. The Appendices are expressly incorporated herein by reference in their entireties. In the event of a conflict between the teachings of this application and those of the incorporated Appendices, the teachings of this application control.

All documents cited in this application are hereby incorporated by reference as if recited in full herein.

Although illustrative embodiments of the present invention have been described herein, it should be understood that the invention is not limited to those described, and that various other changes or modifications may be made by one skilled in the art without departing from the scope or spirit of the invention.

2. The multidentate ligand of claim 1, wherein Z is Si(R$_4$)$_2$; and wherein R$_4$ is selected from the group consisting of H, halide, alkyl, aryl, aralkyl, heteroalkyl, heteroaryl, alkoxy, hydroxy, heteroalkoxy, amino, alkylamino, arylamino, cyano or a heterocyclic group.
3. The multidentate ligand according to claim 1, having the following structure:
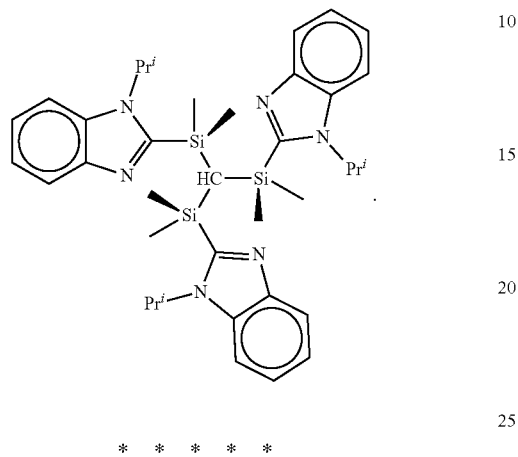

What is claimed is:

1. A multidentate ligand having the structure of formula

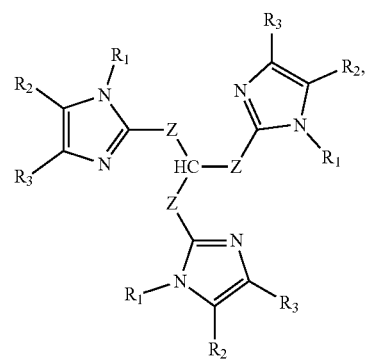

(I)

wherein:
Z is a linker group that comprises a silicon-containing group;
$R_1$ is selected from the group consisting of H, halide, alkyl, aryl, aralkyl, heteroalkyl, heteroaryl, alkoxy, hydroxy, heteroalkoxy, amino, alkylamino, arylamino, cyano, nitro, sulfonyl, or a heterocyclic group;
$R_2$ and $R_3$ are independently selected from the group consisting of H, halide, alkyl, aryl, aralkyl, heteroalkyl, heteroaryl, alkoxy, hydroxy, heteroalkoxy, amino, alkylamino, arylamino, cyano, nitro, sulfonyl, or a heterocyclic group; or together form a saturated or unsaturated $C_{5-7}$ homocyclic or heterocyclic ring, wherein the ring is optionally substituted with groups selected from H, halide, alkyl, aryl, aralkyl, heteroalkyl, heteroaryl, alkoxy, hydroxy, heteroalkoxy, amino, alkylamino, arylamino, cyano, nitro, sulfonyl, or a heterocyclic group.